United States Patent
Chanler et al.

(10) Patent No.: US 10,482,029 B1
(45) Date of Patent: Nov. 19, 2019

(54) DISTRIBUTED SHARED MEMORY PAGING

(71) Applicant: EMC IP Holding Company LLC, Hopkinton, MA (US)

(72) Inventors: Andrew Chanler, Berlin, MA (US); Kevin Tobin, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 127 days.

(21) Appl. No.: 15/664,042

(22) Filed: Jul. 31, 2017

(51) Int. Cl.
*G06F 12/00* (2006.01)
*G06F 12/1009* (2016.01)
*G06F 3/06* (2006.01)
*G06F 12/14* (2006.01)
*G06F 12/1045* (2016.01)

(52) U.S. Cl.
CPC ........ *G06F 12/1009* (2013.01); *G06F 3/0619* (2013.01); *G06F 3/0665* (2013.01); *G06F 3/0689* (2013.01); *G06F 12/1063* (2013.01); *G06F 12/1475* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 6,370,632 B1* | 4/2002 | Kikuta | G06F 12/0837 711/205 |
| 8,375,174 B1 | 2/2013 | Cartmell et al. | |
| 8,862,832 B1 | 10/2014 | Cartmell et al. | |
| 2009/0216984 A1* | 8/2009 | Gainey, Jr. | G06F 9/30003 711/166 |

OTHER PUBLICATIONS

U.S. Appl. No. 15/086,439, filed Mar. 31, 2016, Cache Management Techniques.

* cited by examiner

*Primary Examiner* — Jason W Blust
(74) *Attorney, Agent, or Firm* — Muirhead and Saturnelli, LLC

(57) ABSTRACT

Techniques for obtaining metadata may include: receiving, by a director, an I/O operation directed to a target offset of a logical device, wherein the director is located on a board including a local page table used by components on the board; querying the local page table for a global memory address of first metadata for the target offset of the logical device; and responsive to the local page table not having the global memory address of the first metadata for the target offset of the logical device, using at least a first indirection layer to obtain the global memory address of the first metadata. The global memory may be a distributed global memory including memory segments from multiple different boards each including its own local page table. Compare and swap operations may be used to perform atomic operations to ensure synchronized access when updating the distributed global memory.

18 Claims, 16 Drawing Sheets

DISTRIBUTED SHARED MEMORY PAGING

BACKGROUND

Technical Field

This application generally relates to memory, and more particularly in connection with distributed memory.

Description of Related Art

Computer systems may include different resources used by one or more host processors. Resources and host processors in a computer system may be interconnected by one or more communication connections. These resources may include, for example, data storage devices such as those included in the data storage systems manufactured by Dell Inc. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform I/O (input/output) operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, hosts and other components may be interconnected by one or more communication connections such as in a network configuration. The network may support transmissions in accordance with well-known protocols such as TCP/IP (Transmission Control Protocol/Internet Protocol), UDP (User Datagram Protocol), and the like. Networked storage systems, such as data storage arrays, may be used to maintain data on different systems in different locations.

SUMMARY OF THE INVENTION

In accordance with one aspect of techniques herein is method of obtaining metadata comprising: receiving, by a director, an I/O operation directed to a target offset of a logical device, wherein the director is located on a board including a local page table used by components on the board; querying the local page table for a global memory address of first metadata for the target offset of the logical device; and responsive to the local page table not having the global memory address of the first metadata for the target offset of the logical device, using at least a first indirection layer to obtain the global memory address of the first metadata. The global memory address may be an address in a distributed global memory comprising a plurality of global memory segments stored on a plurality of boards, and wherein the plurality of boards may include the board with the director that received the I/O operation, and wherein a first of the plurality of global memory segments may be included on the board with the director. The first indirection layer may include a plurality of pointers to pages of metadata for the logical device, and wherein the first indirection layer may be stored in the distributed global memory. A first of the pages of metadata for the logical device may include the first metadata. The first page may be stored at a first global memory address in the distributed global memory, and wherein the pages of metadata for the logical device may be configured to be paged in and out of the distributed global memory at various points in time. The plurality of boards may include a plurality of local page tables, wherein each of the plurality of boards may include a different one of the plurality of local page tables used by components of said each board. Each of the plurality of boards may include at least one director that uses a particular one of the plurality of local pages tables, included on said each board, to obtain metadata for at least one logical device. The first metadata may be used in connection with servicing the I/O operation, and wherein the first metadata may include any of: location information identifying a physical storage area mapped to the target offset of the logical device; cache location information denoting if user data of the target offset of the logical device is stored in cache and if so, identify a location in the cache where the user data is stored; and information used to verify or validate the user data. The first page including the first metadata may have a corresponding page descriptor stored in the distributed global memory. The page descriptor may include: a lock used to control and synchronize access to the corresponding page descriptor; an indicator denoting whether data of the first page stored in the distributed global memory is clean or dirty, wherein dirty indicates that the data of the first page stored in the distributed global memory is a more recent version than another copy of data of the first page stored on non-volatile storage; a key identifying data stored in the first page, or otherwise denoting that a page of global memory associated with the page descriptor is free; and a node mask identifying which of the plurality of boards has a reference to the first global memory address stored in the plurality of local page tables. The node mask may be used in connection with first processing performed to remove the first page from the distributed global memory. The first processing may include selectively sending a request to each of the plurality of boards identified in the node mask. The request may be requesting that each board remove the reference to the first global memory address from one of the plurality of local page tables included on the board. A compare and swap operation may be performed to write to the distributed global memory in connection with modifying at least one of: the page descriptor, the first indication layer, and the first metadata of the first page stored at the first global memory address. A plurality of indirection layers may include the first indirection layer, and wherein the plurality of indirection layers may be used to obtain the global memory address of the first metadata. The global memory may be a distributed global memory. The plurality of indirection layers may be stored in the distributed global memory, and wherein at least a second of the plurality of indirection layers may include pages configured to be paged in and out of the distributed global memory. The plurality of indirection layers may include global memory addresses of locations in the distributed global memory. One of the indirection layers includes global memory addresses storing metadata for the logical device.

In accordance with another aspect of techniques herein is a system comprising: one or more processors; and a memory comprising code stored thereon that, when executed, performs a method of obtaining metadata comprising: receiving, by a director, an I/O operation directed to a target offset of a logical device, wherein the director is located on a board including a local page table used by components on the board; querying the local page table for a global memory address of first metadata for the target offset of the logical device; and responsive to the local page table not having the global memory address of the first metadata for the target offset of the logical device, using at least a first indirection layer to obtain the global memory address of the first metadata.

In accordance with another aspect of techniques herein is a computer readable medium comprising code stored thereon that, when executed, performs a method of obtaining metadata comprising: receiving, by a director, an I/O operation directed to a target offset of a logical device, wherein the director is located on a board including a local page table used by components on the board; querying the local page table for a global memory address of first metadata for the target offset of the logical device; and responsive to the local page table not having the global memory address of the first metadata for the target offset of the logical device, using at least a first indirection layer to obtain the global memory address of the first metadata. The global memory address may be an address in a distributed global memory comprising a plurality of global memory segments stored on a plurality of boards. The plurality of boards may include the board with the director that received the I/O operation, and wherein a first of the plurality of global memory segments may be included on the board with the director. The first indirection layer may include a plurality of pointers to pages of metadata for the logical device, and wherein the first indirection layer may be stored in the distributed global memory. A first of the pages of metadata for the logical device may include the first metadata. The first page may be stored at a first global memory address in the distributed global memory, and wherein the pages of metadata for the logical device may be configured to be paged in and out of the distributed global memory at various points in time. The plurality of boards may include a plurality of local page tables. Each of the plurality of boards may include a different one of the plurality of local page tables used by components of the board.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
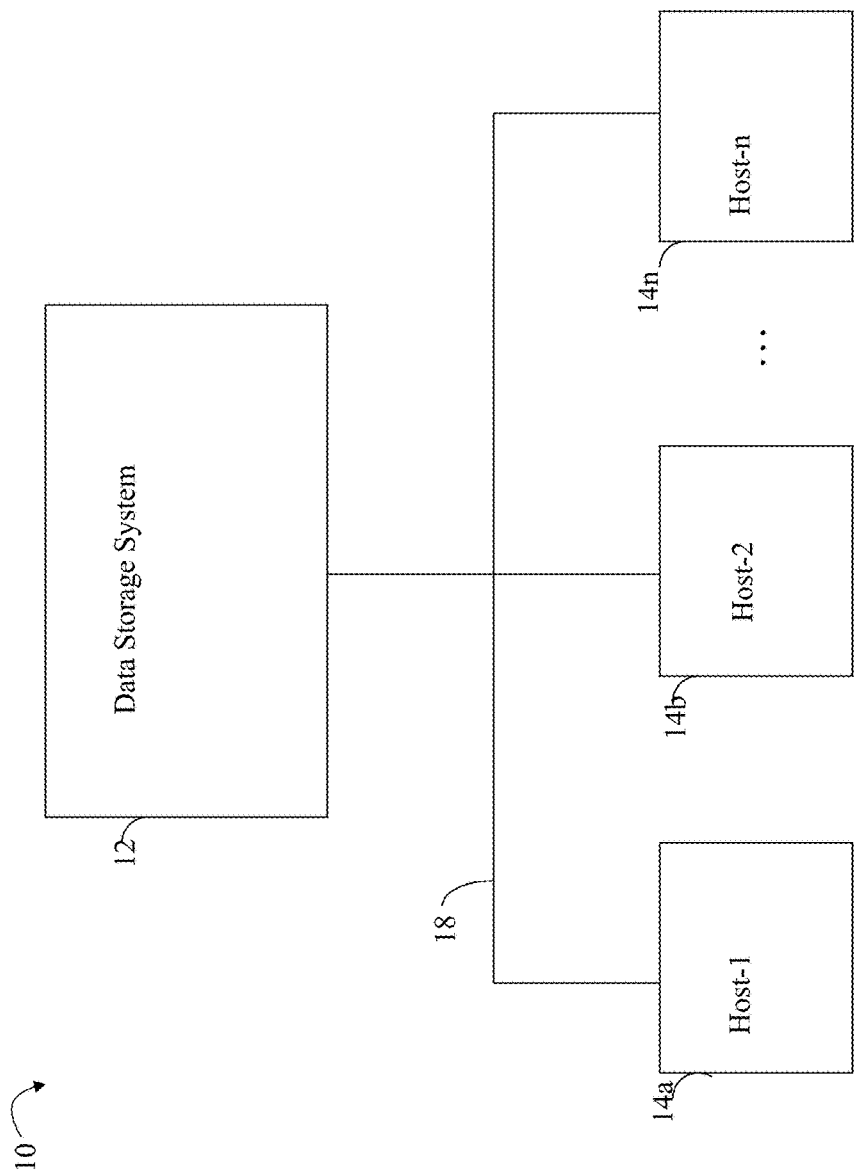
FIGS. 1, 2A, 3 and 4 are examples of embodiments of systems and components that may utilize the techniques described herein.

Referring to FIG. 1, shown is an example of an embodiment of a system and components that may be used in performing the techniques described herein. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, an IBM mainframe computer system, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, ESCON, Fibre Channel, FICON, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
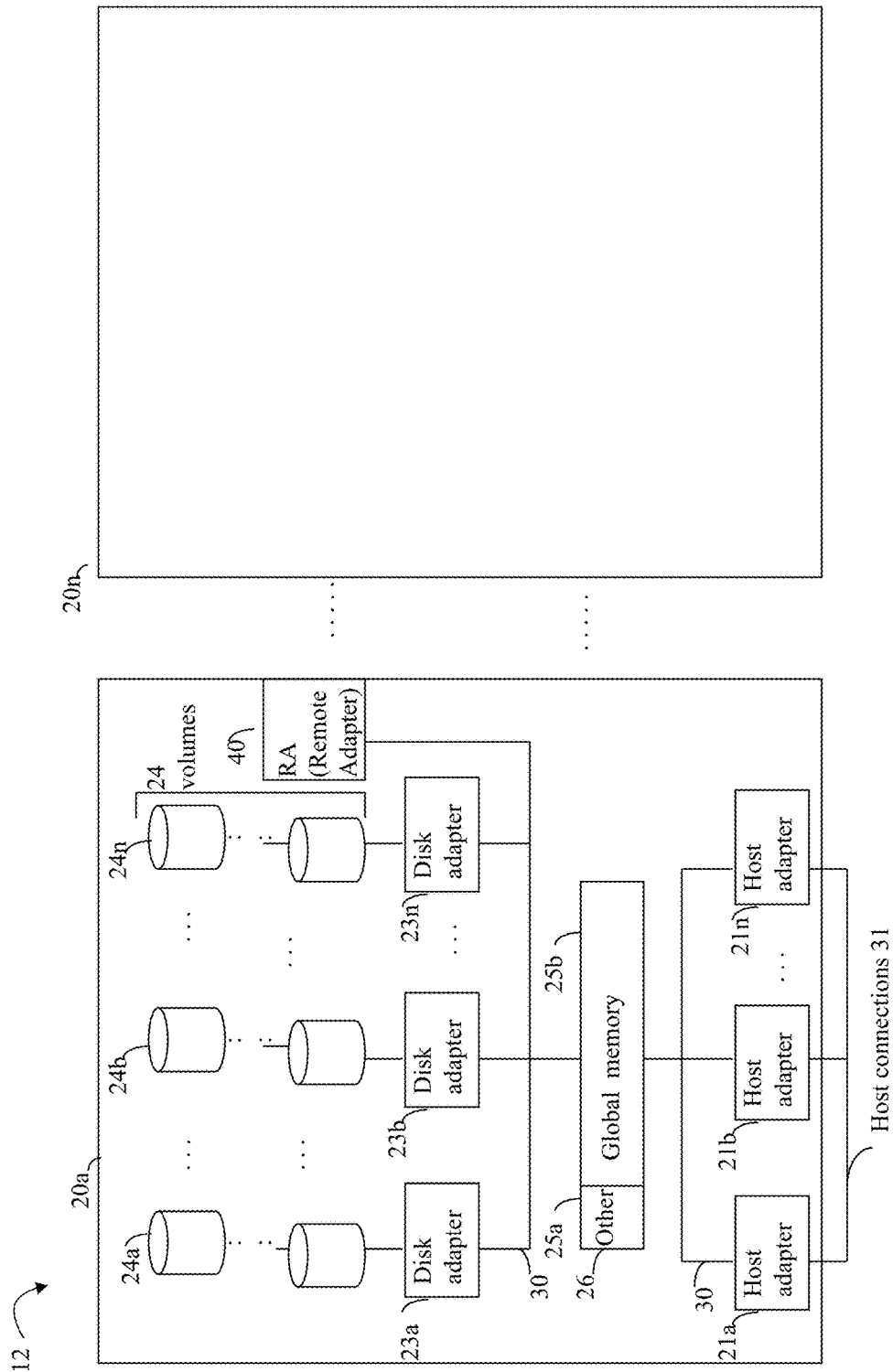

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices, such as disk devices or volumes (more generally physical storage devices), in an exemplary arrangement 24 consisting of n columns of disks or volumes 24a-24n. In this arrangement, each column of disks or volumes may be connected to a disk adapter ("DA") or director responsible for the backend management of operations to and from a portion of the disks or volumes 24. In the system 20a, a single DA, such as 23a, may be responsible for the management of a column of disks or volumes, such as row 24a. The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other, more generally, other front end adapter which facilitates host communication.

Also shown in the storage system 20a is an RA or remote adapter 40. The RA may be hardware including a processor used to facilitate communication between data storage systems, such as between two of the same or different types of data storage systems.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations (e.g., read and write I/O operations) using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable physical storage device such as a rotating disk drive, flash-based storage, and the like. The particular data storage system as described in this embodiment, or a particular device thereof, such as a rotating disk or solid state storage device (e.g., a flash-based storage device), should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. For example, one or more logical devices or volumes may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated physical storage devices or drive(s) and logical devices residing thereon.

I/O requests, such as read and write requests sent from a host to the data storage system, may be directed to a target address, such as a logical device and location on the logical device. The target address may be mapped or translated into a corresponding physical storage location on physical storage storing the data for the corresponding target address. Such I/O requests from the host may be received by a front end director or adapter, such as the HA or FA described herein. The receiving FA may perform processing to service the I/O operation. Global memory, or a subset thereof, on the data storage system, may be used as the data cache (also referred to as simply as a cache herein). In at least one embodiment, write data received at the data storage system from a host or other client may be initially written to the cache (e.g., cache memory such as may be included in the component designated as 25b) and marked as write pending (WP). Once written to cache, the host may be notified that the write operation has completed. At a later point time, the write data marked as WP may be destaged from cache to the physical storage device, such as by a DA. If the I/O operation is a read request to read data from a logical device location, processing is performed to determine whether the requested read data is already stored in cache thereby resulting in a read hit. If there is a read hit, the FA may retrieve the requested read data from cache and return the requested read data to the host or other client that issued the read. If the read data is not stored in cache resulting in a read miss, a request is issued to retrieve the requested read data from physical storage. Data that is read from physical non-volatile storage devices, such as back-end physical storage devices accessed by the DAs, is then stored in the cache. The FA may retrieve the requested read data now stored in cache and return the requested read data to the host or other client that issued the read.

The data cache may be partitioned into multiple cache slots each storing different data. For example, in connection with user data such as in connection with read and write operations, for each cache slot including cached user data, the data cache may also include information about the user data cached in the particular cache slot. For example, for each cache slot, information stored in the cache may include flags denoting state information for the cached data (e.g., whether the cached data is write pending), a logical address on a logical device of the cached data, and the like.

It should be noted that data storage system global memory, such as denoted by 25b in FIG. 2A, may denote a logical representation of global memory. As described in more detail elsewhere herein, the global memory of the data storage system, such as used in connection with data caching for I/O operations, may be implemented as a distributed global memory with different portions of the global memory local to different corresponding directors or adapters. In such an embodiment, all portions of the global memory may be generally accessible to all directors. Particular one or more portions of the global memory may be local with respect to a particular director with remaining non-local portions of the global memory accessible to the particular director using a communications fabric, such as an Infiniband (IB) fabric. The foregoing as may be included in at least one embodiment of techniques herein is described in more detail below.

Figure 2B:
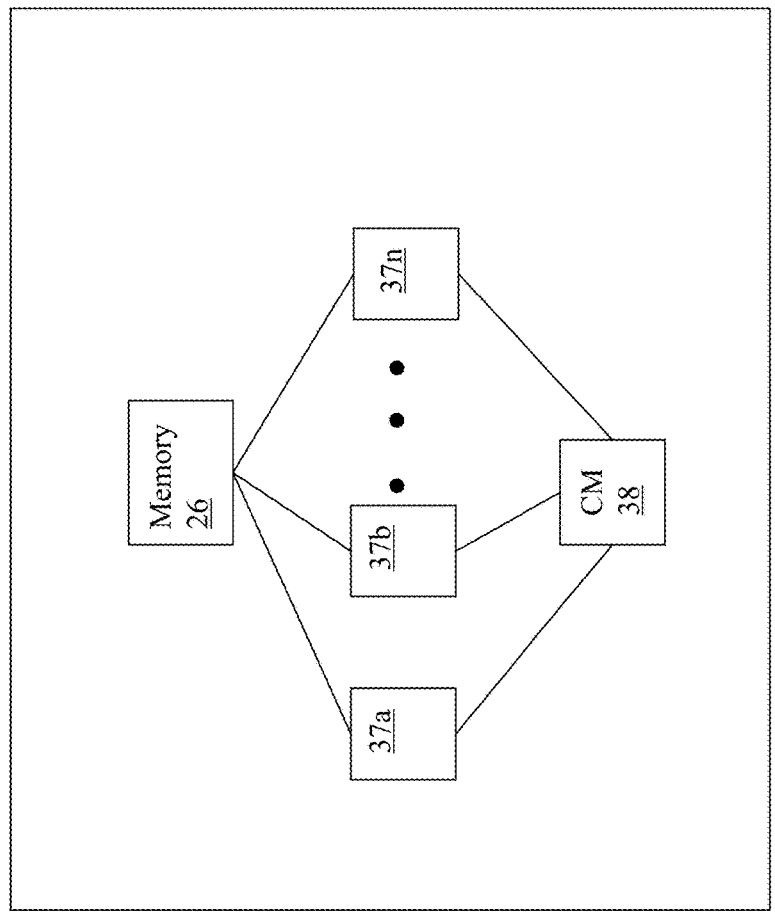
FIG. 2B is a representation of the logical internal communications between the directors and memory included in one embodiment of the data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. The representation of FIG. 2B also includes an optional communication module (CM) 38 that provides an alternative communication path between the directors 37a-37n. Each of the directors 37a-37n may be coupled to the CM 38 so that any one of the directors 37a-37n may send or receive a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending director 37a-37n may be able to broadcast a message to all of the other directors 37a-37n at the same time.

In an embodiment in accordance with techniques herein, the data storage system may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

Figure 3:
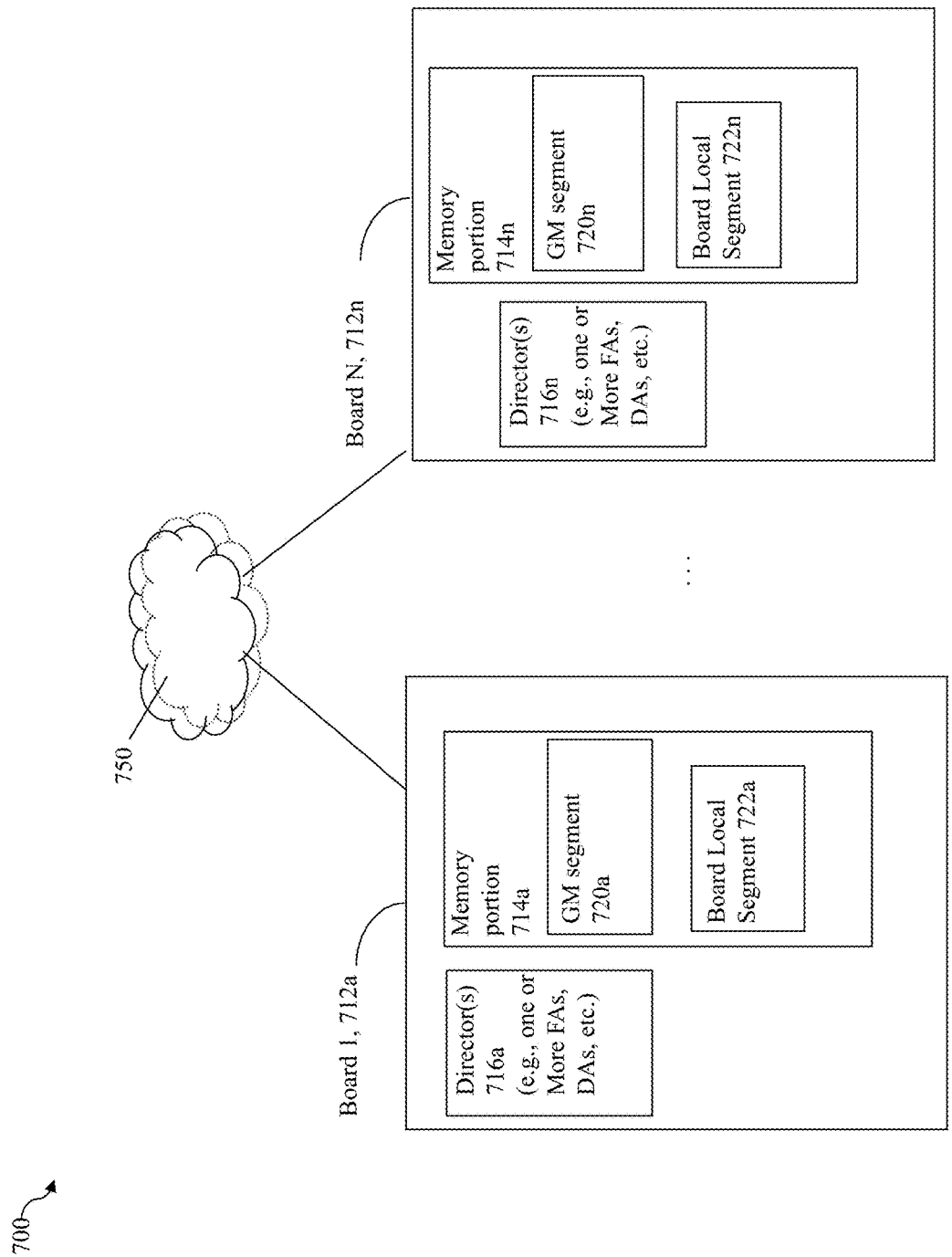

Referring to FIG. 3, shown is an example of multiple boards as may be included in an embodiment of a data storage system in accordance with techniques herein. In this example 700, the data storage system may include a plurality of boards 712a-712n and a messaging fabric 750 over which the boards 712a-n may communicate. Each of the boards 712a-712n may include components thereon as illustrated. The fabric 750 may include, for example, a switch and connections between the switch and boards 712a-712n. In at least one embodiment, the fabric 750 may be an IB fabric.

In following paragraphs, further details are described with reference to board 712a but each of the N boards in a system may be similarly configured. For example, board 712a may include one or more directors 716a and memory portion 714a. The one or more directors 716a may be processors configured to function as one of the different directors as described herein. For example, element 716a may denote that processors of board 712a are configured to operate, such as by executing code, as any one or more of an FA, DA, RA, and the like. In at least one embodiment in accordance with techniques herein, each of the boards 712a-n may be configured to include a single director (e.g., each of 716a-n may denote a single director).

Each of the boards 712a-n may, respectively, also include memory portions 714a-n. The memory portion of each board may be characterized as locally accessible with respect to that particular board and with respect to other components on the same board. For example, board 712a includes memory portion 714a which is memory that is local to that particular board 712a. Data stored in memory portion 714a may be directly accessed by a CPU or core of a director 716a of board 712a. For example, memory portion 714a may be a fast memory (e.g., DIMM (dual inline memory module) DRAM (dynamic random access memory)) that is locally accessible by a director 716a where data from one location in 714a may be copied to another location in 714a directly using DMA operations (e.g., local memory copy operations) issued by director 716a. Thus, the director 716a may directly access data of 714a locally without communicating over the fabric 750. As an alternative, in at least one embodiment, the director 716a may also be configured to use the fabric 750 to access data of 714a.

The memory portions 714a-714n of boards 712a-n may be further partitioned into different portions or segments for different uses. For example, each of the memory portions 714a-714n may respectively include GM segments 720a-720n configured for collective use as segments of a distributed GM. Thus, data stored in any GM segment 720a-n may be accessed by any director 716a-n on any board 712a-n. Additionally, each of the memory portions 714a-n may respectively include board local segments 722a-n. Each of the board local segments 722a-n are respectively configured for use locally by the one or more directors 716a, and possibly other components, residing on the same single board. In at least one embodiment where there is a single director denoted by 716a (and generally by each of 716a-n), data stored in the board local segment 722a may be accessed by the respective single director 716a located on the same board 712a. However, the remaining directors located on other ones of the N boards may not access data stored in the board local segment 722a.

To further illustrate, GM segment 720a may include information such as user data stored in the data cache, metadata, and the like, (as described in more detail below) that is accessed (e.g., for read and/or write) generally by any director of any of the boards 712a-n. Thus, for example, any director 716a-n of any of the boards 712a-n may communicate over the fabric 750 to access data in GM segment 720a. In a similar manner, any director 716a-n of any of the boards 712a-n may generally communicate over fabric 750 to access any GM segment 720a-n comprising the global memory. Although a particular GM segment, such as 720a, may be locally accessible to directors on one particular board, such as 712a, any director of any of the boards 712a-n may generally access the GM segment 720a. Additionally, the director 716a may also use the fabric 750 for data transfers to and/or from GM segment 720a even though 720a is locally accessible to director 716a (without having to use the fabric 750).

Also, to further illustrate, board local segment 722a may be a segment of the memory portion 714a on board 712a configured for board-local use solely by components on the single/same board 712a. For example, board local segment 722a may include data described in following paragraphs which is used and accessed only by directors 716a included on the same board 712a as the board local segment 722a. In at least one embodiment in accordance with techniques herein and as described elsewhere herein, each of the board local segments 722a-n may include a local page table or page directory used, respectively, by only director(s) 716a-n local to each of the boards 712a-n.

In such an embodiment as in FIG. 3, the GM segments 720a-n may be logically concatenated or viewed in the aggregate as forming one contiguous GM logical address space of a distributed GM. In at least one embodiment, the distributed GM formed by GM segments 720a-720n may include the data cache, various metadata (MD) and/or structures, and other information, as described in more detail elsewhere herein. Consistent with discussion herein, the data cache, having cache slots allocated from GM segments 720a-n, may be used to store I/O data (e.g., for servicing read and write operations).

Figure 4:
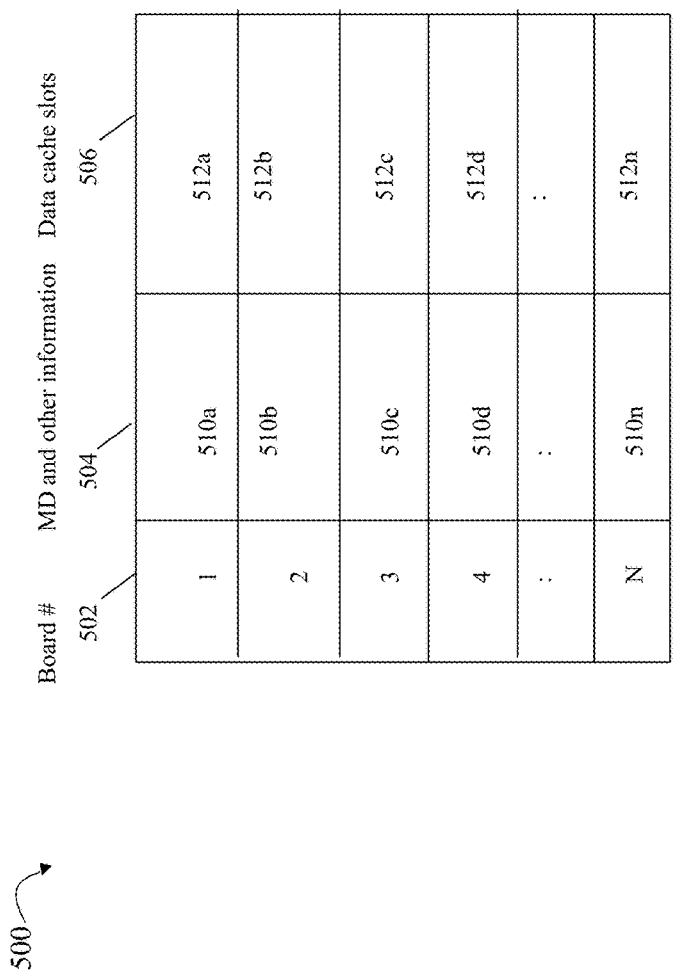

Referring to FIG. 4, shown is an example 500 illustrating a logical representation of data that may be stored in the distributed GM of the different boards 712a-n in an embodiment in accordance with techniques herein. The example 500 illustrates portions of the distributed cache, and thus distributed GM, in an embodiment including N boards, such as illustrated in FIG. 3. Column 502 denotes the particular board number or identifier, column 504 denotes the various MD and other information stored in GM across the GM segments 720a-n of boards 712a-n, and column 506 denotes the data cache slots stored in the GM segments 720a-n of the boards 712a-n.

Elements 510a-510n, respectively, denote the MD and other information stored collectively in the GM segments 720a-n of the N boards 712a-n (as identified in column 502). Elements 512a-n, respectively, denote the data cache slots stored collectively in the GM segments 720a-n of N boards 712a-n. In this manner, columns 504, 506 respectively denote a logical representation of the aggregated data that may be stored in the distributed GM of the data storage system. Each of 510a-n denotes a portion of the MD and other information stored in one of the GM segments 720a-n. For example, element 510a may denote the MD and other information of board 1 712a stored in GM segment 720a where GM segment 720a is local to the board 712a; element 510b may denote the MD and other information of board 1 712b stored in GM segment 720b where GM segment 720b is local to the board 712b; and so on with respect to each row of table 500 for a different one of the N boards.

Consistent with discussion elsewhere herein, the example 500 illustrates some of the data and information that may be included in memory portions 714a-n respectively on the boards 712a-n. More generally, an embodiment in accordance with techniques herein may also store other types of data and information in other regions of the memory portions 714a-n.

Figure 5:
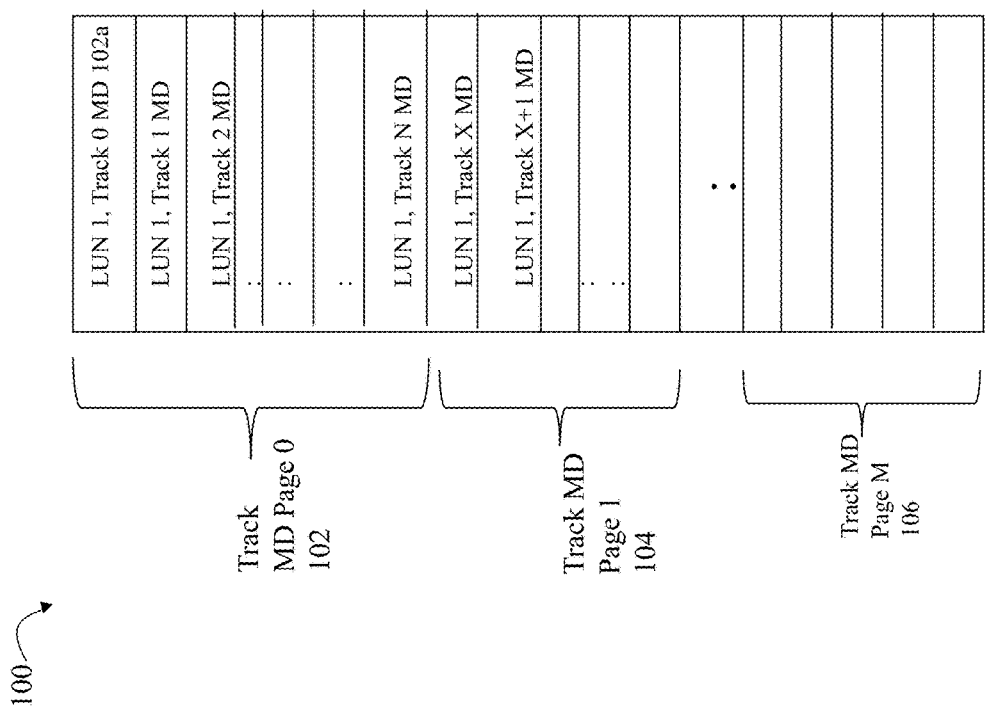
FIG. 5 is an example of track MD pages that may be used in an embodiment in accordance with techniques herein.

Referring to FIG. 5, shown is an example of MD that may be used in an embodiment in accordance with techniques herein. In one embodiment, the user data may be arranged in units of storage, such as tracks of a LUN where each track is of a particular size, such as 128 Kbytes of user data per track. For each track, there may exist user data and associated MD. In the example 100, MD may be maintained for each track of a LUN whereby, for example, I/O operations from a host may be directed to a logical address or offset, such as a track, on the LUN. In this case, the data storage system uses MD for the track in connection with servicing the I/O operation. The example 100 illustrates a logical structure or arrangement including an entry for the MD per track. It should be noted that the track and examples of particular track size as described herein are merely illustrative of one particular unit of storage that may be used in an embodiment in accordance with techniques herein. More generally, an embodiment may use any suitable size and type of storage unit to denote a logical offset, address, location, and the like, on a LUN (e.g., whereby data may be stored at the logical offset, address location, and like, on the LUN).

The MD may be generally partitioned into multiple categories. In one embodiment, the MD categories may include:

1. Location information. Location information may include, for example, the physical device storage location denoting where the user data is stored on physical storage such as disks or flash-based non-volatile storage. Consistent with discussion herein, the data storage system may receive a host I/O that reads or writes data to a target location expressed as a LUN and offset, logical address, track, etc. on the LUN. The target location is a logical LUN address that may map to a physical storage location where data stored at the logical LUN address is stored. Thus, one type of MD for a track of a LUN may include location MD identifying the physical storage location mapped to the track. Location information may include, for example, cache location information denoting if the user data is stored in cache and if so, identify the location in the cache where the user data is stored.

2. Data Description. Data description information may include, for example, a checksum or other information describing the user data. For example, the checksum may be used to verify or validate the user data's validity when read from physical non-volatile storage, for example, to ensure there has not been user data corruption or error in connection with obtaining the user data from the physical storage. Use of a checksum in data validation and error detection is known in the art. A checksum is a count of the number of bits in a transmission unit that is included with the unit so that the receiver can check to see whether the same number of bits arrived. If the counts match, processing may determine that the complete transmission was received and there has been no error in the data transmitted.

3. Advanced functionality. Advanced functionality MD may relate to other data facilities or services. For example, an embodiment may support remote data replication such as, for example, the Symmetrix Remote Data Facility (SRDF®) products provided by EMC Corporation of Hopkinton, Mass. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

Data storage device communication between Symmetrix™ data storage systems using the SRDF® product is described, for example, in U.S. Pat. Nos. 5,742,792, 5,544,347, and 7,054,883, all of which are incorporated by reference herein. With the SRDF® product, a user may denote a first storage device, such as R1, as a master storage device and a second storage device, such as R2, as a slave storage device. Other incarnations of the SRDF® product may provide a peer to peer relationship between the local and remote storage devices. For example, the host may interact directly with the device R1 of first local data storage system, but any data changes made are automatically provided to the R2 device of a second remote data storage system using the SRDF® product. In operation, the host may read and write data using the R1 volume in the first data storage system, and the SRDF® product may handle the automatic copying and updating of data from R1 to R2 in second remote data storage system. The SRDF® replication functionality may be facilitated with the RAs provided at each of the foregoing first and second data storage systems. Performing remote data communications using the SRDF® product over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein.

The advanced functionality MD may denote, for example, whether the user data is replicated by such a data facility such as the SRDF® product, whether the remote or replication copy of the user data is valid or up to date with the primary location copy of the user data, and the like.

Generally, the advanced functionality MD may also include MD about other data facilities or services, for example, regarding snapshots (e.g., such as whether data of a particular track/LUN is a snapshot or serves as a base data copy of which a snapshot is taken), compression (e.g., whether data of the track/LUN is compressed), deduplication, and the like.

In at least one embodiment, at least some of the above-noted types or categories of MD, such as the location information MD and the checksum or other information of the data description MD, may be stored per track as illustrated in FIG. 5. Each per track MD may be needed in connection with servicing I/O operations and may be stored in a form of fast memory or storage. For example, an embodiment may store MD (e.g., location information MD, checksum and other MD information used for data validation) for as many data tracks as possible in the cache, or more generally, in the distributed GM of the data storage system. Thus, storing the MD in cache or other form of fast storage provides for obtaining needed MD, such as location MD, in a timely manner to service I/O operations and other processing in connection with the associated user data.

The per track MD as discussed above may be stored in cache, or more generally the distributed GM. The example 100 illustrates per track MD as just described. Element 102 denotes that MD for a first set of tracks is stored in page 0 of the distributed GM (e.g., storage allocated from any one or more of GM segments 720a-n). Element 104 denotes that MD for a second set of tracks is stored in page 1 of the distributed GM. Element 106 denotes that MD for an Mth set of tracks is stored in page M of the distributed GM.

Generally, the amount of MD describing all user data, such as stored on LUNs configured in a data storage system, is large in size. Modern storage systems are capable of storing a large amount of user data and therefore a large amount of MD is needed to describe such user data. Additionally, the complexities of the modern data storage system, such as due to the available data services, may define a feature set requiring a lot of MD to describe each user data track. In some cases, the amount of user data and associated MD make it impractical to store all MD for all user data in GM. In other words, the size of the cache and GM is typically smaller than the amount of storage needed to store all the MD along with storing other necessary data in GM. In this case, a data storage system in accordance with techniques herein may use a paging mechanism for storing MD in cache, or more generally, the GM.

Paging is generally known in the art and commonly used in connection with memory management, such as for virtual memory management. In connection with virtual memory management, paging is a method of writing data to, and reading it from secondary storage, such as physical disk or other non-volatile storage, for use in primary storage, such as main memory. In a memory management system that takes advantage of paging, the operating system reads data from secondary storage in blocks or chunks that may also be referred to as pages. Since the amount of the primary storage is typically much smaller than the amount of data on secondary storage, it is not possible to store all such data in the primary storage. Thus, data may be read from secondary storage and stored in the primary storage as needed. When the primary storage no longer has available locations and another primary storage location is needed for storing new or additional data not already in primary storage, techniques may be used to select a primary storage location whereby any data in the selected primary storage location may be overwritten with the new or additional data. Prior to overwriting the selected primary storage location with the new or additional data, the current data of the selected primary storage location may be written out, as needed, to its corresponding secondary storage location (e.g., written out if the primary storage location copy is more recent or up to date than the secondary storage copy). In such a case, the current data in the selected primary location may be characterized as paged out of the primary memory (e.g., available on secondary storage but not primary storage) and the new or additional data may be characterized as paged in to the primary memory. The new or additional data is also stored on the secondary storage.

In connection with storing MD in the cache, or more generally GM in an embodiment of a data storage system, paging may be performed in a similar manner where the primary storage is the GM and the secondary storage is the physical storage device (e.g., disk or flash-based non-volatile backend storage accessed by the DAs). Thus, MD may be retrieved from back-end physical storage as needed and stored in cache, such as for servicing read operations requesting user data associated with the MD. Once the MD is in cache or GM, such MD may be removed from cache or GM (e.g., evicted, removed, overwritten, paged out, and the like) as cache or GM locations storing such MD are needed in connection with other processing. A page may refer to a single unit or amount of memory located in the cache, or more generally, the distributed GM whereby stored in each page in GM may be brought into GM (e.g., paged into GM) and also paged out of (e.g., evicted from) GM as may be needed. In at least one embodiment, various techniques such as may be used for general cache management (e.g., eviction policy for selecting data of cache slots for removal from cache, flushing policy for determining when and/or how much write pending data to flush from cache to non-volatile storage, and the like) may also be applied for use with distributed GM management.

It should be noted that storing the MD on back-end physical storage which is read and/or written to physical storage by the DA is one possible way in which an embodiment in accordance with techniques herein may store and access MD on a form of non-volatile storage. More generally, an embodiment may store the MD on any form of non-volatile storage and access such MD as needed in any suitable manner.

Without use of paging in at least one arrangement with distributed GM, the entire set of system MD (e.g., including per track MD for all LUNs or logical devices) may be stored in the distributed GM at all times. In connection with a system using paging of MD with a distributed GM (whereby the different types or categories of MD for LUNs as noted above may be paged out of GM), techniques described in following paragraphs may be used. Such techniques may be used with a distributed GM that pages MD in and out of the distributed GM. Techniques herein may utilize an indirection layer that resides in the distributed GM where the indirection layer may be significantly smaller in size than the per track MD itself. In at least one embodiment, the indirection layer may be a single level or layer that remains resident in GM (e.g., is not paged out of the distributed GM) and where the LUN track MD may be paged out of the distributed GM. Additionally, information of the indirection layer may be updated accordingly as MD pointed to, or referenced by, the indirection layer is paged in and/or out of the distributed GM. Generally, the indirection layer may include one or more levels of indirection (e.g., one or more levels of pointers that are GM addresses). In at least one embodiment including multiple indirection layers or levels, where the first referenced or highest indirection layer may not be paged out of GM and where pages of other remaining indirection layers may be paged out of GM in a manner similar to the track MD pages. Additionally, with techniques herein, each board 712*a-n* may include a page directory or local page table stored in its board local segment 722*a-n* of memory. The page directory or local page table for a particular board is its own board-local view of what MD is paged in to GM (e.g., stored at particular GM addresses). The foregoing and other aspects and details of techniques herein are described in more detail below.

Referring again to FIG. 5, the example 100 illustrates per track MD such as may be used in connection with performing I/O operations and other processing in connection with data stored on each particular track of a LUN. Also illustrated in 100 are track MD pages 102, 104 and 106 where each track MD page includes per track MD for a specified (e.g., an integer number) of tracks. The example 100 illustrates a logical set of pages including per track MD for a single LUN. In a similar manner, a different set of one or more track MD pages may include per track MD for each LUN in the system. Although the set of one or more pages 100 including a LUN's track MD may be logically viewed as a sequence of contiguous pages, each of the track MD pages may be physically located in non-contiguous locations in physical storage (e.g., in GM and also non-volatile storage).

In at least one embodiment in accordance with techniques herein, additional information for each LUN may also be stored in GM. Such additional information may include, for example, a per LUN MD object identifying the particular number of pages including track MD for each LUN. For example, a first LUN MD object for LUN 1 may indicate that M track MD pages (102-106) include track MD for LUN1. The M pages containing the LUN's MD may store the MD for tracks of the LUN based on sequential ordering of the tracks. The sequential ordering of per track MD for a LUN may facilitate locating MD of particular tracks of the LUN within the logical representation of the pages as in 100. Additionally, viewing the collective M pages as a contiguous logical representation, the MD of a particular track of a LUN may be expressed, for example, using a page number and logical offset or location within the page identified by the page number. In at least one embodiment, each page of track MD may include MD for only a single LUN (e.g., no page of track MD includes MD from 2 different LUNs).

In at least one embodiment in accordance with techniques herein, a page table may be used to map a logical page and offset (e.g., such as a track MD page and offset) to its corresponding physical memory location in GM (e.g., map a page number and offset to a corresponding GM address or physical page frame number and offset in GM). In at least one embodiment the page table may store the GM address of the physical page frame number and may not explicitly store the track offset within the page frame since, as discussed elsewhere herein, the offset may be calculated based on a constant or fixed number of tracks per page.

In connection with an embodiment in accordance with techniques herein, an indirection layer may be utilized where the indirection layer generally includes one or more levels of indirection.

Figure 6:
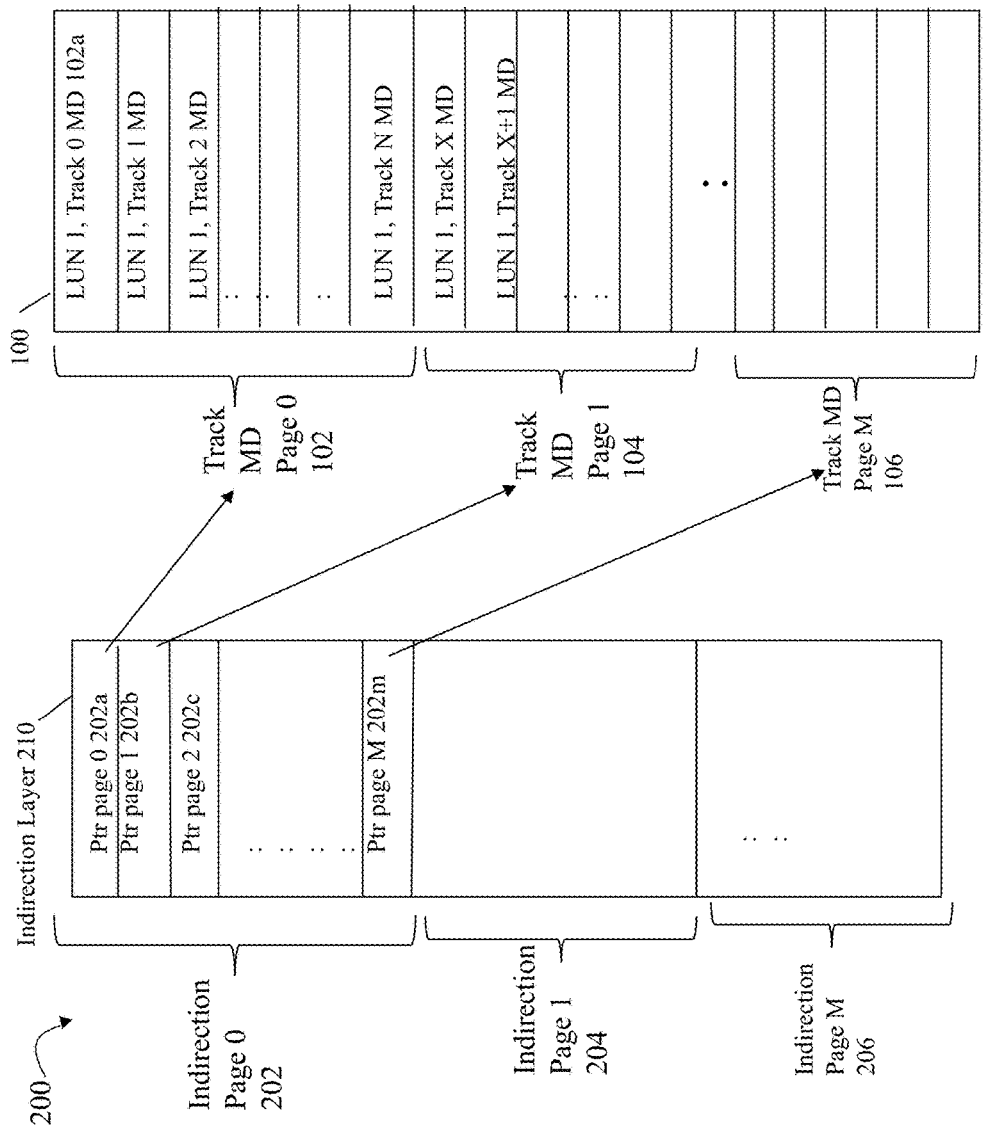
FIG. 6 is an example of track MD pages and an indirection layer that may be used in an embodiment in accordance with techniques herein.

With reference to FIG. 6, shown is an example 200 of structures that may be used in an embodiment in accordance with techniques herein with an indirection layer 210 including 1 level of indirection. The example 200 includes MD structure or table of the example 100 denoting the pages of track MD for tracks of the LUN as described above and illustrated in FIG. 5. Additionally, the example 200 includes indirection layer 210 which is generally a structure, such as a table, of entries where each entry is a pointer or reference to a different page of track MD stored in GM. For example entry 202*a* is a pointer to track MD page 0 102; entry 202*b* is a pointer to track MD page 1 104; and entry 202*m* is a pointer to track MD page M 106. Entries or elements 202*a-m* may also be referred to herein as indirection pointers to the actual pages of MD (e.g., track MD pages 102, 104 106). An integer number of indirection pointers of the indirection layer 210 may be included in a single page, also referred to as an indirection page. For example, M indirection pointers 202*a-m* may be included in the single indirection page 0, 202. In a similar manner, different sets of M indirection pointers may be included in each of the indirection pages 1 (104) through M (106) of the indirection layer 210.

In at least one embodiment, each entry in the indirection layer 210 that points to a track MD page may identify the GM address (e.g., physical address or location in GM such as page frame in GM) where that particular page of track MD is stored (if such page of track MD is currently paged into GM).

In one aspect the indirection layer 210 is itself another form of MD, indirection MD, comprising one or more MD pages of indirection pointers or GM addresses of pages of track MD. A page of the indirection layer MD 210, such as indirection page 0 202, may be used to store the indirection pointers or GM addresses (e.g., 202*a-m*) to the actual pages (e.g., track MD pages 0 (102) through M (106)) of per track MD of the structure 100. In at least one embodiment, the indirection layer 210 may also reside in pages of the distributed GM. Thus, each indirection page 202, 204, 206 may also be mapped to a corresponding GM address of a page frame and offset identifying a physical location in GM where such indirection page is stored.

As described in more detail elsewhere herein, the indirection layer 210 may be accessed, for example, by executing code of a director in connection with obtaining MD for a particular track of a LUN when performing processing to service an I/O operation directed to that particular track of the LUN. For example, assume an FA director 716*a* of board 712*a* receives an I/O operation directed to LUN 1, track 0 having its MD stored at entry or address 102*a*. The director 716*a* may access the track MD 102*a* using indirection layer 210. That is, using the indirection layer 210, the director 716*a* may obtain the indirection pointer 202*a* to MD page 0 (102) (e.g., whereby element 202*a* denotes the entry of the indirection layer 210 that includes the GM address to the beginning of track MD page 0 102 (e.g. address of entry 102*a*)). Using the address or indirection pointer 202*a*, the director 716*a* may then obtain the needed MD for LUN 1 track 0 from entry 102*a* of track MD page 0 102. Director 716*a* may also store in its board local segment 722*a* the address or indirection pointer 202*a* where the GM address references or points to track MD page 0 102. In this manner, using indirection pointer 202*a*, director 716*a* may subsequently obtain track MD directly from table 100 for any track included in track MD page 102 (e.g., MD for any of tracks 0-N of LUN as illustrated in the example 200 of FIG. 6).

Continuing with the above example regarding director 716*a* obtaining track MD for LUN 1, track 0, the GM address or indirection pointer 202*a* obtained from the indirection layer 210 may be stored and cached locally in the page directory or local page table in board local segment 722*a*. Generally, as described in more detail elsewhere herein, the page directory or local page table of each board may include pointers or GM addresses to pages of MD in the distributed GM. In one aspect, the page directory or local page table of each board may be viewed as a board local cache of at least some of the GM addresses of different track MD pages as stored in the indirection layer 210. In at least one embodiment, the page directory or local page table of each board may map a particular track MD page to its corresponding GM address of its physical location in GM (e.g., map a page number to its corresponding GM address or page frame number and offset in GM).

Generally, an embodiment in accordance with techniques herein may computationally determine the particular logical page (e.g., track MD page number) of the table 100, and also offset or location within the particular track MD page, which includes desired MD for a particular LUN and track. Similarly, an embodiment may computationally determine the particular indirection layer page (e.g., indirection page number of indirection layer 210), and also offset or location within the particular indirection layer page, that includes the GM address of the track MD page of the table 100 with the desired MD for the particular LUN and track. In at least one embodiment, such calculations may be based on the known or predetermined configuration regarding how many tracks have their corresponding MD stored in a single track MD page of the table 100, and how many page pointers or GM addresses of track MD pages may be stored in a single indirection layer page.

To illustrate, assume that each of the page of the table 100 stores track MD for 4 tracks (e.g., track MD page 102 stores track MD for 4 tracks); and each page of the indirection layer 210 stores 4 GM addresses or 4 pointers to 4 different track MD pages. Assume further that tracks for LUN 1 have their MD stored in consecutive entries of consecutive pages of track MD beginning with track MD page 0. In this case, the following identifies the particular indirection layer page number, entry or offset within the indirection page number, track MD page, and entry or offset within the track MD page that may be mapped to a particular track of LUN 1 to obtain desired track MD:

| Track # | Track MD page | Track MD page entry/offset | In-direction page | Indirection Page Entry/offset |
|---|---|---|---|---|
| 0 | 0 | 0 | 0 | 0 |
| 1 | 0 | 1 | 0 | 0 |
| 2 | 0 | 2 | 0 | 0 |
| 3 | 0 | 3 | 0 | 0 |
| 4 | 1 | 0 | 0 | 1 |
| 5 | 1 | 1 | 0 | 1 |
| 6 | 1 | 2 | 0 | 1 |
| 7 | 1 | 3 | 0 | 1 |
| 8 | 2 | 0 | 0 | 2 |
| 9 | 2 | 1 | 0 | 2 |
| 10 | 2 | 2 | 0 | 2 |
| 11 | 2 | 3 | 0 | 2 |
| 12 | 3 | 0 | 0 | 3 |
| 13 | 3 | 1 | 0 | 3 |
| 14 | 3 | 2 | 0 | 3 |
| 15 | 3 | 3 | 0 | 3 |
| 16 | 4 | 0 | 1 | 0 |
| 17 | 4 | 1 | 1 | 0 |
| 18 | 4 | 2 | 1 | 0 |
| 19 | 4 | 3 | 1 | 0 |
| 20 | 5 | 0 | 1 | 1 |
| 21 | 5 | 1 | 1 | 1 |

Figure 7A:
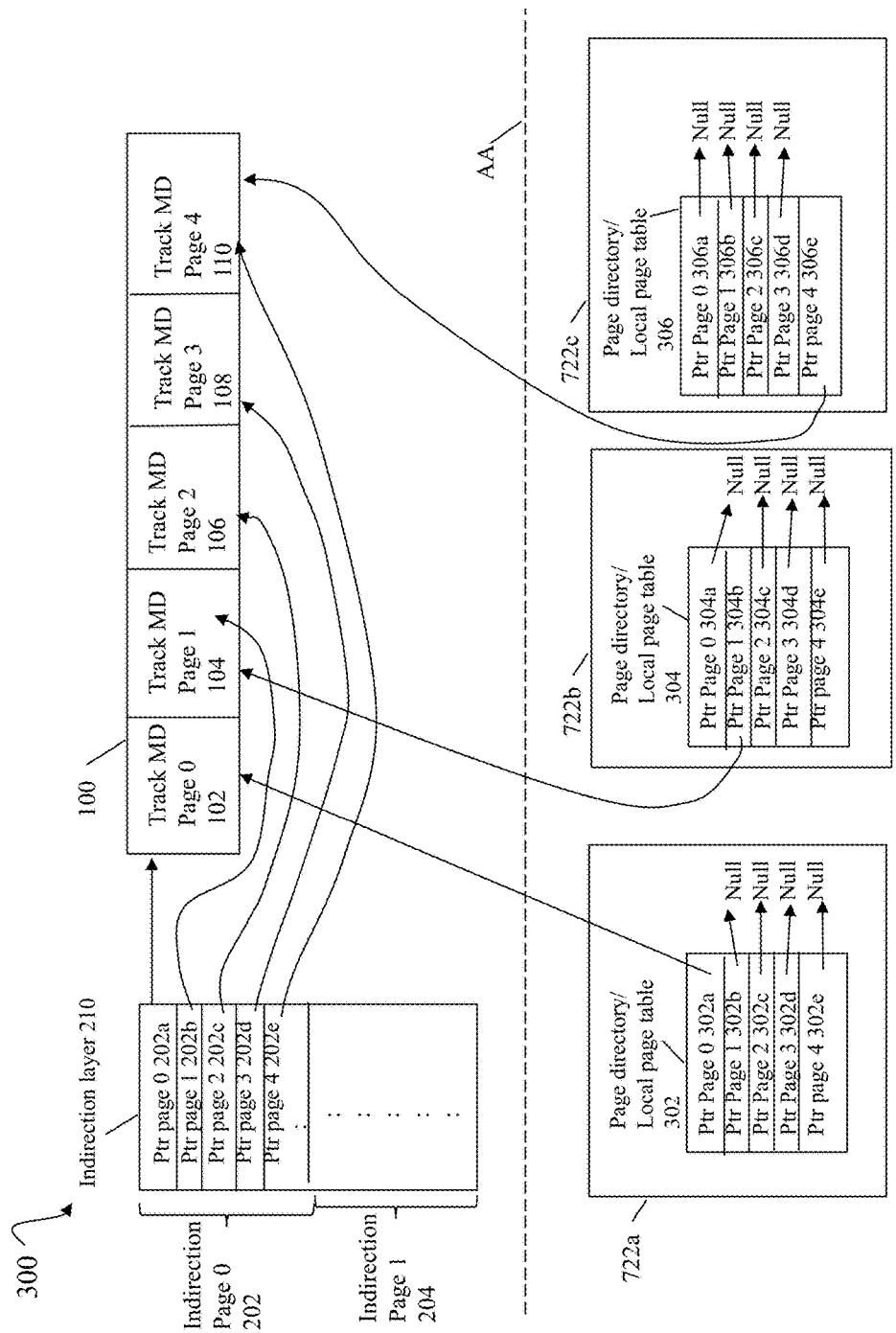
FIG. 7A is an example of track MD, the indirection layer, and local page tables that may be used in an embodiment in accordance with techniques herein.

Referring to FIG. 7A, shown is an example illustrating structures and information that may be used in an embodiment in accordance with techniques herein. The example 300 includes dashed line AA whereby structures above line AA may be stored in the distributed GM. Structures 302, 304 and 306 below dashed line AA may be stored, respectively in 3 different board local segments of memory 722*a-c*. The structures 210 and 100 in the example 300 which are in GM (e.g., above dashed line AA) may be as described above, for example in connection with FIG. 6. FIG. 7A also now illustrates the page directories or local page tables as may be maintained for use locally by the one or more directors of each of the boards 712*a-n*. For simplicity of illustration, the example 300 includes only 3 page directories or local pages tables 302, 304, 306. However, consistent with discussion elsewhere herein, a page directory or local page table may be stored in the board local segment of memory on each of the boards 712*a-n*.

As illustrated, each of the local page tables 302, 304 and 306 may include GM addresses (identify GM locations) for different sets of track MD pages. In other words, the content of all local page tables is not the same and not required to be synchronized. For example, table 302 only includes a GM address 302*a* to the track MD page 0 102. Table 302 is illustrated as including null values for pointers or addresses 302*b-e* to indicate table 302 does not include GM addresses to track MD pages 104, 106, 108 and 110. Table 304 only includes a GM address 304*b* to the track MD page 1 104. Table 304 is illustrated as including null values for pointers or addresses 304*a*, 304*c-e* to indicate table 304 does not include GM addresses to track MD pages 102, 106, 108 and 110. Table 306 only includes a GM address 306*e* to the track MD page 4 110. Table 306 is illustrated as including null values for pointers or addresses 306*a-d* to indicate table 306 does not include GM addresses to track MD pages 102, 104, 106, and 108.

Assume a director on board 712*a* needs to obtain track MD for LUN 1, track 0. In this example, the director may use page directory or local page table 302 as stored in its board local memory segment 722*a*. The director may determine the track MD page containing the desired track MD, which based on FIG. 7A is track MD page 0 102. The director may then query its page directory or local page table 302 to lookup the GM address of the desired track MD page number 0 for LUN 1. In this case, the director determines that 302*a* of table 302 does include the GM address for track MD page 0, 102. Using the GM address obtained from table 302, the director may obtain the desired track MD from the particular offset in page 102 of GM, such as by issuing a request over the fabric 750.

Assume a second director on another board needs to obtain track MD for LUN 1, track 0. The second director may be included on the board having board local memory segment 722*b* and may use page directory or local page table 304. The second director may determine the track MD page containing the desired track MD, which based on FIG. 7A is track MD page 0 102. The second director may then query its page directory or local page table 304 to lookup the GM address of the desired track MD page number 0. In this case, the director determines that table 304 does not include the GM address for track MD page 0 (e.g., there is a "miss" whereby the page directory or local page table 304 does not include the GM address of the desired track MD page number 0, 102). Since table 304 does not include the GM address of the track MD page 0 102, the second director may query or lookup the GM address of the desired track MD page 0, 102 using the indirection layer 210. The second director may determine that the indirection page 0, 202, contains the desired GM address of the track MD page 0 in entry or offset 202*a*. The second director may then obtain, from 202*a* of the indirection page 0 202, the pointer to, or GM address of, track MD page 0 102. The second director may obtain the desired track MD from the particular offset in page 102 of GM, such as by issuing a request over the fabric 750.

Figure 7B:
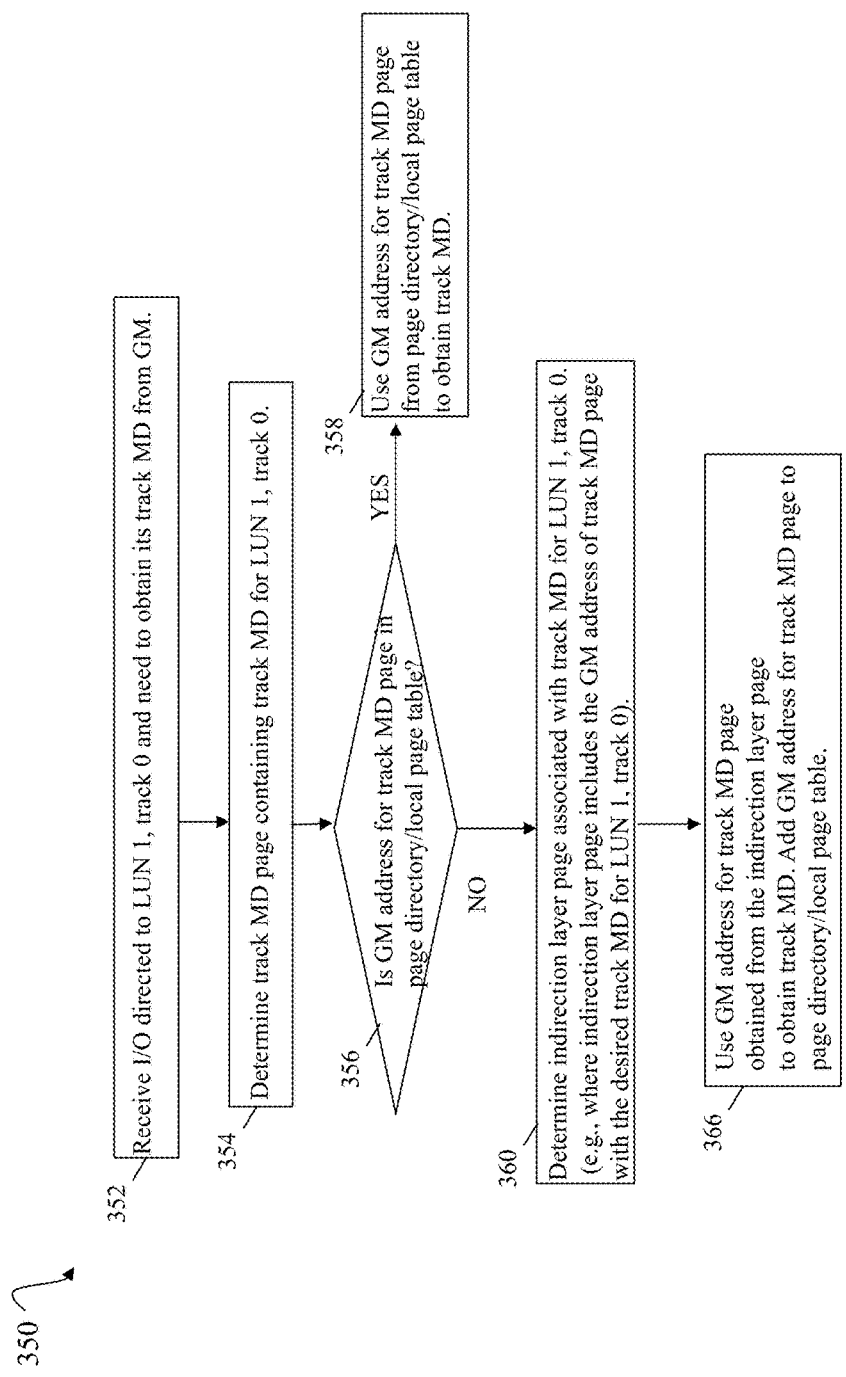
FIGS. 7B, 9, 10,11, 13A and 13B are flowcharts of processing steps that may be performed in an embodiment in accordance with techniques herein.

Referring to FIG. 7B, shown is a flowchart of processing steps that may be performed in an embodiment in accordance with techniques herein. The flowchart 350 generally summarizes processing as described above with reference to FIG. 7A such as for a director that needs to obtain track MD from GM for LUN 1, track 0. The director may be, for example, an FA that receives an I/O operation from a host. At step 352, the FA receives the I/O directed to LUN 1, track 0 and needs to obtain the track MD for LUN 1, track 0 from GM. At step 354, processing may be performed to determine the track MD page containing the track MD for LUN 1, track 0. In this example, the track MD page 0, 102, includes the track MD for LUN 1, track 0. At step 356, a determination is made as to whether the GM address for track MD page 0, 102 can be found by querying the page directory/local page table of the director. If step 356 evaluates to yes, the director obtains the desired track MD using the GM address for the track MD page 0, 102 as obtained from the page directory/local page table.

If step 356 evaluates to no, control proceeds to step 360 where processing is performed to determine the indirection layer page associated with the track MD for LUN 1, track 0 (e.g., where indirection layer page 0, 202, includes the GM address of track MD page 102 with the desired track MD for LUN 1, track 0). From step 360, control proceeds to step 366 to use the GM address (202*a*) for the track MD page 0 (102) as included in the indirection page 0 (202) to obtain the desired track MD for LUN1, track 0. Additionally, step 366 may include adding the GM address for the track MD page to the page directory/local page table of the director.

In connection with step 366 as described above, it is assumed that the desired track MD page is currently stored in GM. However, consistent with discussion herein regarding data that may be paged out of GM, it may also be the case that the desired track MD page is currently not paged into GM. If the desired track MD page is not currently stored in GM, the indirection layer page indicates the GM address for the desired track MD page is NULL or no GM address/no pointer. In this case, processing may include allocating a new page of storage from GM into which the desired track MD is then stored/copied into from the non-volatile storage.

Figure 8:
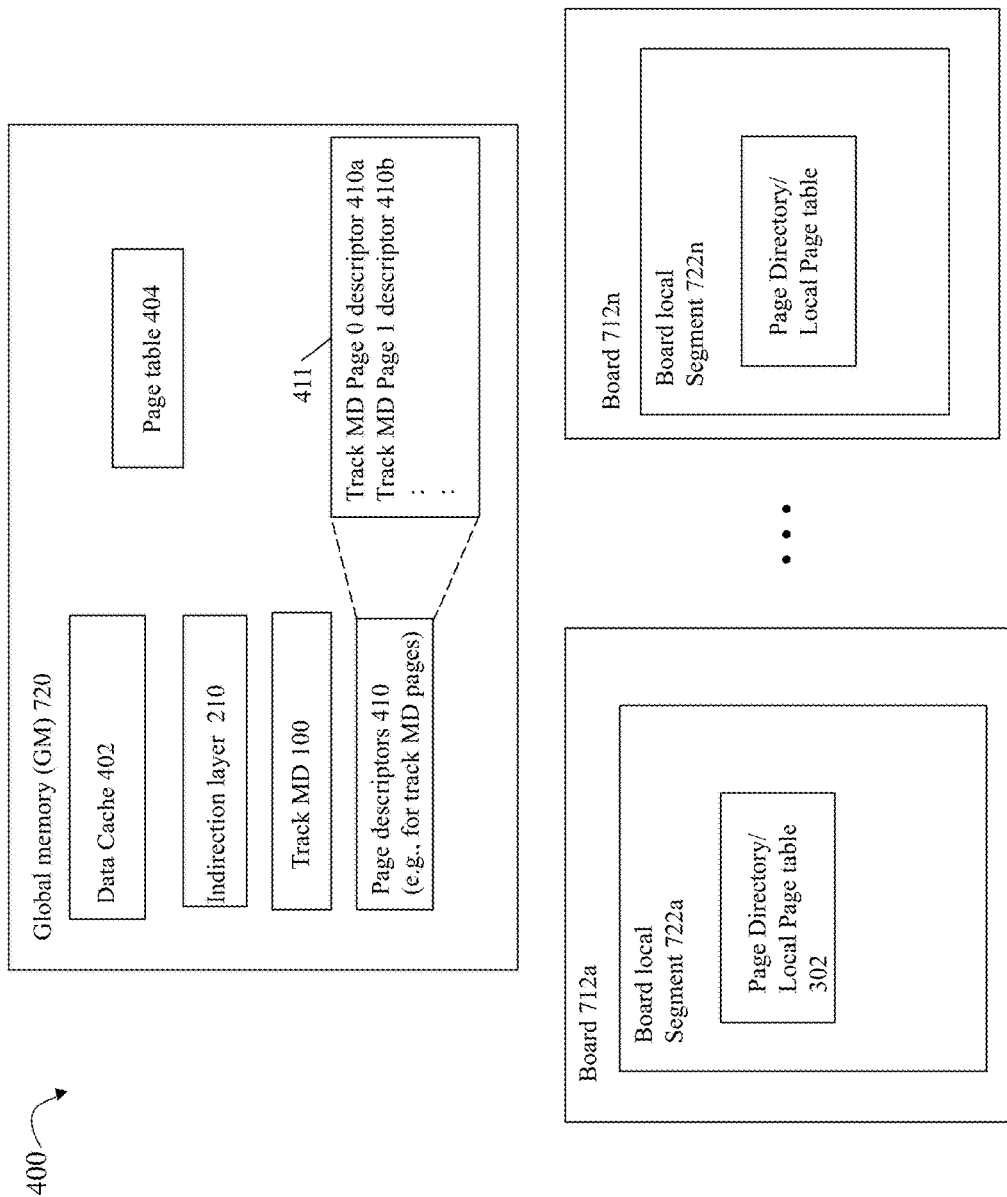
FIG. 8 is an example illustrating placement of various structures including data in GM and local page tables in an embodiment in accordance with techniques herein.

Referring to FIG. 8, shown is an example illustrating a logical representation of components and structures stored therein in an at least one embodiment in accordance with techniques herein. In the example 400, GM 720 may be a logical representation of the distributed GM which, as described herein, comprises GM segments 720*a-n*, respectively, from boards 712*a-n*. The example 400 also illustrates in more detail structures that may be stored in board local segment 722*a* of board 712*a* and board local segment 722*n* of board 712*n*. Other board local segments of other boards may also include structures similar to that as illustrated for 712*a* and 712*n*.

The GM 720 may include data cache 402, indirection layer 210, page table 404 (e.g., global page table used to map GM addresses to corresponding physical GM locations such as mapping pages to page frames), and track MD 100 as described above. Consistent with use of local page tables on boards 712*a-n*, an embodiment in accordance with techniques herein may include a global page table 404 stored in GM 720 whereby each of the local page tables on boards 712*a-n* may be characterized in one aspect as locally caching page table information as may be stored in the global page table 404.

Additionally, in at least one embodiment, the GM 720 may also include page descriptors 410 for the pages of track MD as included in 100 when such pages are currently stored or paged into GM. Generally, pages including any type of data stored into GM may have an associated page descriptor. For example, in at least one embodiment, pages descriptors may also exist for all MD types including indirection MD pages (e.g., 202, 204, 206 of the indirection layer 210) stored in GM. Element 411 illustrates in more detail that page descriptors 410 may be a structure including a track MD page descriptor for each page of track MD in 100. Page descriptors 410 may include track MD page 0 descriptor 410*a* for track MD page 0 (102), track MD page 1 descriptor 410*b* for track MD page 1 (104), and so on, for each page of track MD in 100. Each of the page descriptors in 410 may include information generally used in an embodiment in accordance with techniques herein for a particular one of the pages of track MD included in 100. For example, in at least one embodiment, each page descriptor may include the following:

a key identifying or describing what is in the page, or otherwise indicating the page is free/not in use (e.g., key may identify the particular LUN and track MD page, or more generally the particular page of data that is stored in GM and associated with this page descriptor);

a lock (e.g., Used in connection with synchronizing and controlling access to the MD page);

a node mask identifying which boards have a reference to this page in their local page tables/page directories (e.g., Identifies which board/local page tables include a page table entry mapping this page to a corresponding GM address. This may be implemented, for example, as a bitmask with 1 bit for each board/each local page table that could potentially have a reference or GM address to this page); and a clean/dirty indicator (e.g., Indicates whether the GM copy of the page is the most recent and needs to be flushed/stored to PDs or other non-volatile storage so that the non-volatile storage also includes the most recent/up to date copy of the MD of the page. Dirty indicates the GM copy needs to be flushed/is more recent copy of page MD, and clean indicates otherwise).

In at least one embodiment, the key of a page descriptor for a page including track MD for a particular LUN may include the MD object for the LUN and a relative page number for the page. For example, a LUN A may have MD object 1 and there may be 10 pages of track MD for the LUN A stored in 100. In this case, assuming the 10 pages of track MD for LUN A are currently paged into/stored in GM, 10 corresponding page descriptors may be included in 410 for the 10 pages of track MD for the LUN A. For page 1 of the 10 pages including LUN A's MD, its page descriptor may include the MD for LUN A and the page number 1. For page 2 of the 10 pages including LUN A's MD, its page descriptor may include the MD for LUN A and the page number 2. In at least one embodiment, the foregoing key may be used as the logical address mapped to a corresponding physical GM address by the page table 404 and also local page tables as stored on the boards 712a-n.

In connection with the above, the key may be used in connection with performing atomic compare and swap operations described in more detail below to synchronize access to pages of track MD 100 and the pages of the indirection layer 210. As known in the art, compare-and-swap (CAS) may be characterized as an atomic instruction used to achieve synchronization such as where there may be multiple entities (e.g., threads, processes, routines, directors, etc.) attempting to access a common resource, such as the distributed GM. CAS compares the contents of a memory location with a given value and, only if they are the same, modifies the contents of that memory location to a new given value. As described below, the CAS may use the contents of a location such as the key of the page descriptor, a page pointer field, and the like. As an atomic instruction, the CAS instruction may perform an operation on one or more memory locations "atomically" whereby such an atomic operation either succeeds or fails in its entirety. An embodiment in accordance with techniques herein may implement the CAS instruction or operation in software and/or hardware. For example, in at least one embodiment, the CAS operation or instruction may actually be an instruction in the processor instruction set. A CAS operation may require performing multiple comparisons and multiple updates/writes as an atomic operation.

Additionally, it should be noted that CAS operations as used herein to synchronize access to shared locations, such as page descriptors, and other data stored in GM is one type of operation that may be used for synchronization and control when accessing GM locations. More generally, an embodiment in accordance with techniques herein may use any suitable mechanism to enforce desired synchronization and access control to GM locations.

A CAS operation may implement the following logic as expressed in a C-like pseudocode below where * denotes access through a pointer:

function cas(p: pointer to int, old:int, new:int) returns bool
{
  if *p≠old {/* compare step */
    return false
  } p←new /* modification step */
  return true
}

Thus, the CAS operation has an initial value, "old", for p, and a second later value, "new" for p. If the current value of p (in the compare step immediately prior to performing the update or modification of p in the modification step above) does not match "old", then there has been an intervening unexpected modification of p by another and therefore do not proceed with the modification step.

The node_mask mentioned above may be used to identify each of those boards having a local copy of the GM address of a particular MD page stored in the board local page table (e.g., 302). As described below, the node_mask may be used in connection with customizing and minimizing messages sent between boards. Once a particular board/local page table has been added to the bitmask thereby indicating it has a reference (e.g., pointer or GM address) to a particular page, as described in more detail below, the particular page cannot be paged out of GM without an acknowledgement from each board/local page table identified in the node_mask of the page.

Referring back to FIG. 8, each the board local segment, such as 722a, includes a page directory/local page table, such as 302, as discussed above such as in connection with FIGS. 7A and 7B. Additionally, each of the local page table may identify the GM address of where the different indirection layer pages of the indirection layer 210 are stored in GM 720.

What will now be described are flowcharts of processing steps that may be performed in an embodiment in accordance with techniques herein. The flowcharts summarize processing as described above with additional detail included with steps using the CAS operation.

Figure 9:
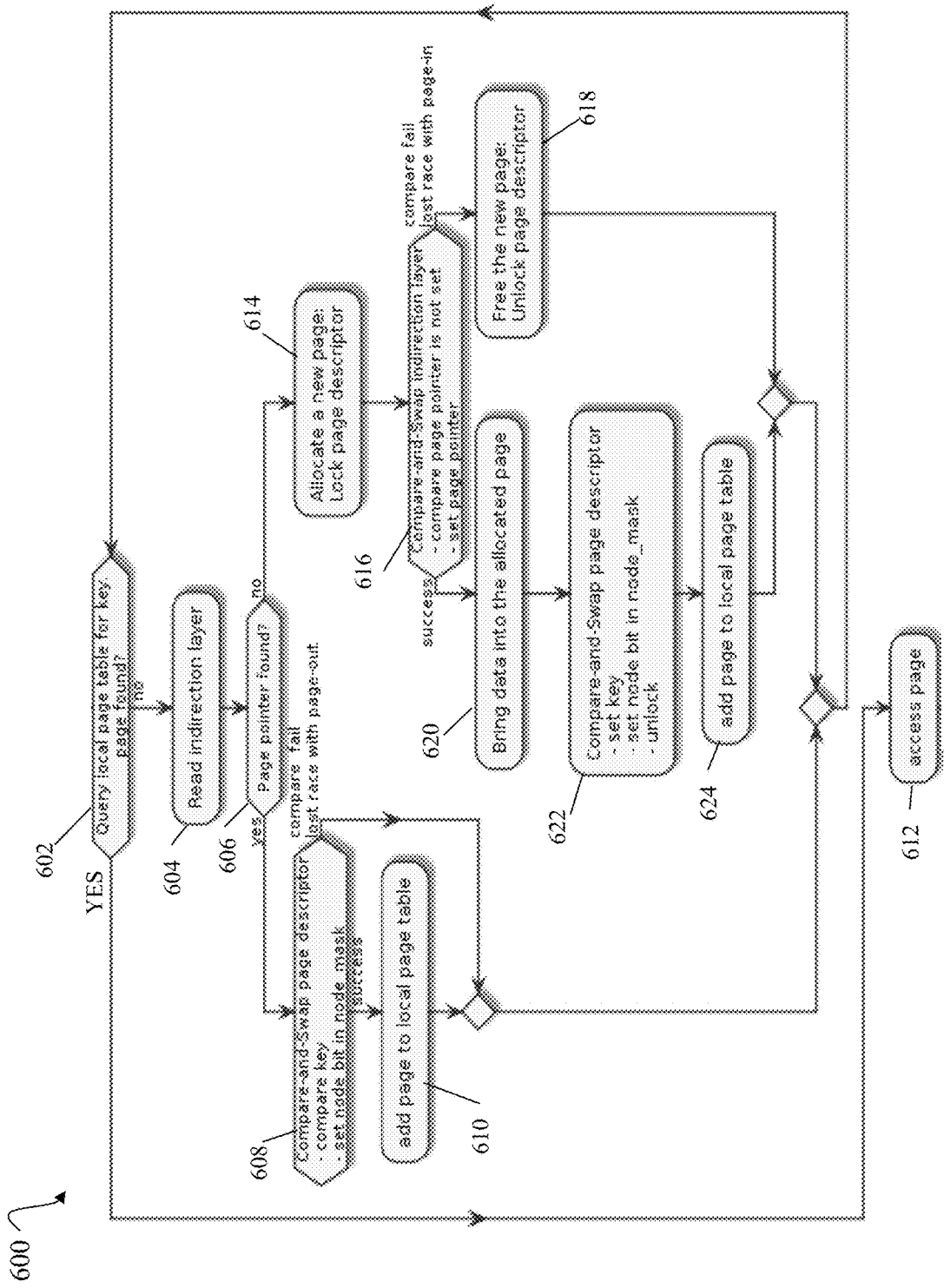

Referring to FIG. 9, shown is a flowchart of processing steps that may be performed in connection with accessing track MD for a particular LUN and track on the LUN. The flowchart 600 includes logical similar to that as in connection with FIG. 7B. The flowchart 600 processing may be performed by a director on a particular board having its local page table.

At step 602, the local page table is queried to determine whether the local page table includes a GM address for the LUN and track. Consistent with discussion elsewhere herein, step 602 may include determining the relative page number (with respect to the total number of MD pages for the LUN) of the track MD page containing the desired track MD (e.g., this is similar to step 354). Step 602 may include querying the local page table using the LUN MD object and relative page number to determine whether the local page table includes an entry mapping the LUN MD object and relative page number (denoting a logical address) to a corresponding GM address. If step 602 evaluates to yes, it means that the track MD page, containing the desired track MD for the LUN and track, is currently paged into GM at the returned GM address. A such, if step 602 evaluates to yes, control proceeds to step 612 to access the track MD page and obtain desired track MD for the LUN and track.

If step 602 evaluates to no, control proceeds to step 604. At step 604, the indirection layer is used to obtain the pointer or GM address of the track MD for the desired LUN and track (e.g., where the indirection layer page associated with the track MD includes the GM address of the track MD page with the desired track MD, as in step 360). Since the indirection pages may are also stored in GM, the local page table may also provide a mapping between the indirection layer page and its corresponding GM address. In this manner, the local page table may be queried in step 604 to obtain a GM address or pointer to the desired indirection page and then, from within the desired indirection page, the GM address or pointer to the desired track MD page. At step 606, a determination is made as to whether the GM address or pointer to the track MD page has been obtained. If step 606 evaluates to no, it means that the GM address or pointer to the desired track MD page was not found using the indirection layer and therefore the desired track MD is currently paged out of GM. If step 606 evaluates to yes, it means the desired track MD page (that contains the desired track MD) is currently paged into GM at the GM address or pointer found using the indirection layer.

If step 606 evaluates to yes, control proceeds to step 608. At step 608, a CAS operation is performed with respect to the key field and the node_mask of the page descriptor for the track MD page including the desired track MD for the LUN and track. Step 608 includes comparing the key field and setting the corresponding bit in the node_mask to for the local page table (to thereby indicate that the local page table as will be updated in step 610 contains a reference (e.g., GM or pointer) to the track MD page including the desired track MD. In step 608, the CAS operation ensures that there has been no modification to the key, and if there has been no modification to key, sets the bit in node_mask for the local page table/board containing the local page table. If the CAS instruction comparison has failed, control proceeds from step 608 to step 602. If the CAS instruction fails in step 608, it means that there has been a race condition with another access to the page out processing (as described in connection with FIGS. 10 and 11) to move the page out of GM. If the CAS instruction of step 608 succeeds, control proceeds to step 610 to updated the local page table to add the GM address or pointer to the track MD page (e.g., add a valid entry in the local page table mapping the track MD page to its corresponding pointer or GM address). From step 610 control proceeds to step 602.

If step 606 evaluates to no, control proceeds to step 614 to allocate a new physical page of GM for storing the desired track MD page. In at least one embodiment, the particular physical page allocated from GM may be preferably allocated from the GM segment local to the director/board performing the processing of FIG. 9. Step 614 also includes locking the page descriptor for the newly allocated page of GM. In at least one embodiment, the pages of the track MD which may be paged in and out of GM may also have corresponding page descriptors (e.g., as included in 410, 411 of FIG. 8). Thus, the locking operation of step 614 may be performed with respect to the lock specified in the page descriptor for the newly allocated GM page. From step 614, control proceeds to step 616. At step 616, a CAS operation is performed with respect to the indirection layer page associated with the desired track MD page to ensure that the pointer field or entry of the indirection layer page has not been set or updated. For example, assume track MD page 102 is currently paged out of GM and includes the track MD needed for LUN 1, track 0. In this case, the indirection layer page 202 has field 202*a* which is null and the CAS operation in step 616 ensures that field 202*a* remains not set or null, and if so, sets the page pointer field 202*a* to point to or contain the GM address of the newly allocated GM page (allocated in step 614). At step 616, a determination is made as to whether the CAS operation has failed. If the CAS operation of step 616 fails, it indicates that current processing has lost an ongoing race condition with other ongoing processing to page in the same track MD page (e.g., lost race with another page-in process also executing steps of flowchart 600 to page into GM the same track MD page).

If step 616 CAS operation fails, control proceeds to step 618 to free the previously allocated physical page of GM (previously allocated in step 614) and unlock the page descriptor (previously locked in step 614). From step 618 control proceeds to step 602.

If step 616 CAS operation succeeds, control proceeds to step 620 where the track MD page is stored in the newly allocated GM page (bring the track MD page into GM). From step 620, processing proceeds to step 622 to perform a CAS operation with respect to the page descriptor for the track MD page just paged into GM in step 620. Step 622 CAS operation ensures that the page descriptor has not been modified and if it has not been modified, then sets the key, sets the node_mask and also unlocks the page descriptor. The key may be set to denote the MD object and associated page number for the track MD page just paged into GM. Thus, in one aspect, setting the key as in step 622 effectively publishes information and indicates that the track MD page has now been paged into GM. The node_mask may be updated to set the corresponding bit to indicate that the local page table (that will be updated in step 624) contains a reference to the particular track MD page. The node_mask in step 624 may be set in a manner similar to that as described in connection with step 608. From step 622, control proceeds to step 624 to update the local page table. Step 624 is similar to step 610. From step 624, control proceeds to step 602.

In connection with FIG. 9 processing as well as other processing described herein, if there is a modification or update to a MD page stored in GM and the modification or updated MD page that has not yet been flushed to non-volatile storage, then the indicator in the page's descriptor may be updated to dirty (e.g., to indicate the GM includes the most recent copy of the page's data that has not yet been stored on non-volatile storage). Once the page in GM has been flushed to non-volatile storage, the indicator may be updated to clean. Thus, referring back to FIG. 9 step 612, if the track MD page accessed is modified or updated, step 612 processing includes setting the page's indicator to dirty.

Figure 10:
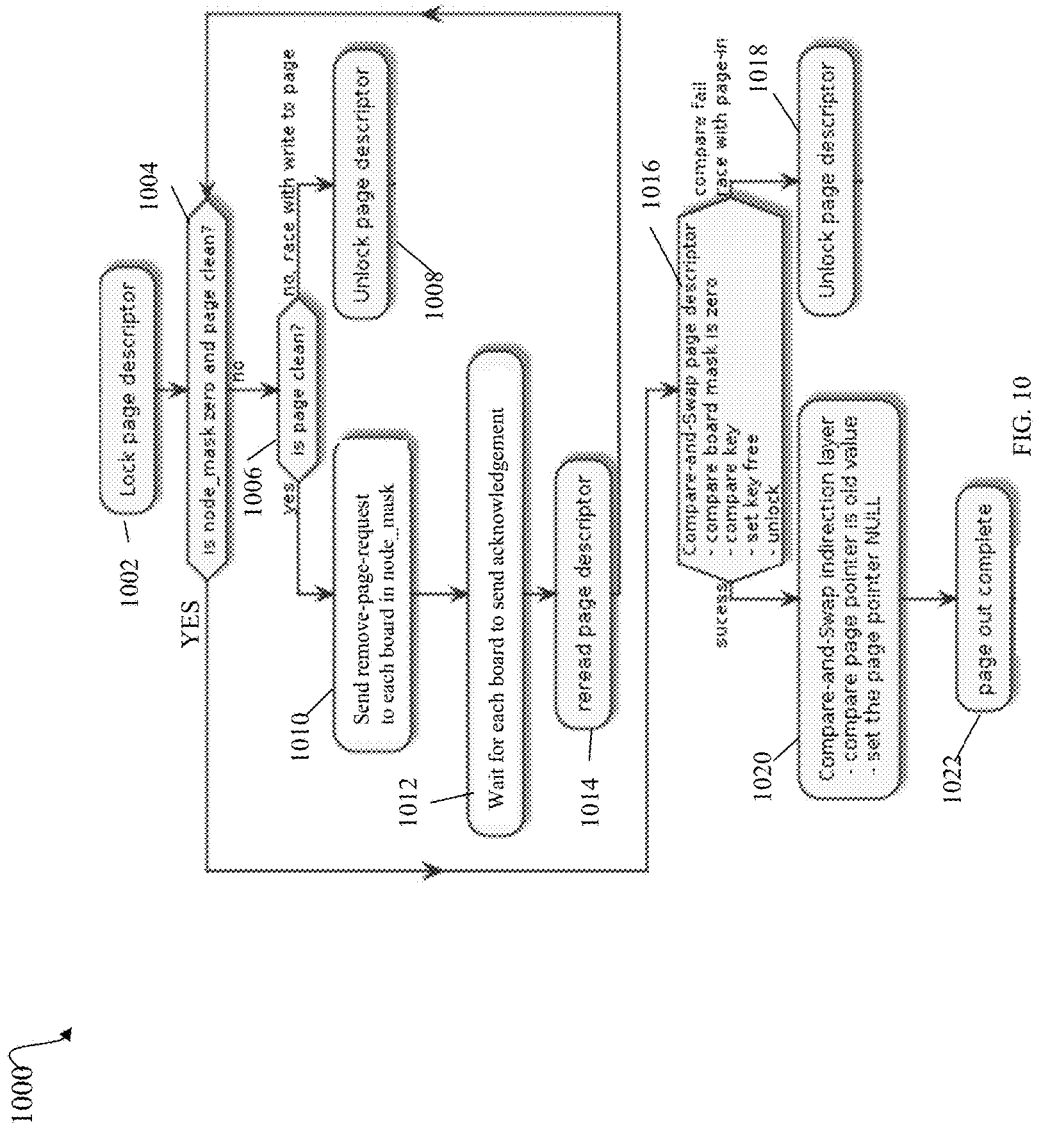

Referring to FIG. 10, shown is a flowchart 1000 of processing steps that may be performed to page out, remove, or evict a page of MD from GM. At step 1002, the page descriptor (of the page of MD being paged out of GM) may be locked. From step 1002, processing proceeds to step 1004 where a determination is made as to whether the node_mask of the page descriptor is zero and the indicator indicates the page is clean. A node_mask of zero indicates no bits are set whereby no local page table includes a reference to the page of MD now being paged out of GM.

If step 1004 evaluates to yes, control proceeds to step 1016 where a CAS operation is performed with respect to the node_mask and key of the page descriptor. The CAS operation ensures that the node_mask remains at zero and the key has not changed, and if so, 1) sets the key field to denote the physical GM page associated with the page descriptor is free for use and 2) unlocks the page descriptor. If the CAS operation of step 1016 fails, it means that the comparison failed due to an ongoing race condition with a competing page-in (e.g., processing of FIG. 9). If the CAS operation of step 1016 fails, control proceeds to step 1018 where processing unlocks the page descriptor. If the CAS operation of step 1016 succeeds, control proceeds to step 1020 to perform another CAS operation with respect to the indirection layer. In particular, the CAS operation of step 1020 attempts to clear out or initialize the appropriate pointer field (e.g., 202a) in the indirection page including the GM address or pointer to the page of track MD now being paged out or removed from GM. For example, referring to FIG. 6, if flowchart 1000 processing is attempting to remove the track MD page 0 102 from GM, step 1020 ensures that the indirection layer page 202, entry 202a is the old value/ has not been modified (e.g., remains equal to the GM address of the track MD page 0 102) and then, if so, sets the page pointer 202a to null. From step 1020, processing proceeds to step 1022 where the page processing is complete.

If step 1004 evaluates to no, control proceeds to step 1006 where a determination is made as to whether the GM page containing the current page of track MD being paged out is clean. If step 1006 evaluates to no, control proceeds to step 1008 to unlock the page descriptor. Step 1006 evaluating to no denotes a competing race condition with other processing to write to the GM page. If step 1006 evaluates to yes, control proceeds to step 1010. In step 1010, a remove-page-request is sent to each board identified in the node_mask as having a reference in its board-local page table to the GM page of track MD now being paged out of GM. Control proceeds to step 1012 to wait for each board to send an acknowledgement in response to its corresponding received remove-page-request. From step 1012, control proceeds to step 1014 to reread the page descriptor. From step 1014, control proceeds to step 1004.

It should be noted that FIG. 10 processing to page out or remove a particular track MD page from GM may be performed responsive to an occurrence of a trigger condition, such as to increase the number of free GM pages responsive to the amount of GM available for use/free falling below a threshold level. The trigger condition may be, for example, responsive to processing performed in connection with GM memory management. For example, a free GM page may be needed for storing data and there may not be any available. As such, the GM memory management may perform processing to select a particular page of track MD for eviction (paged out) from GM.

Figure 11:
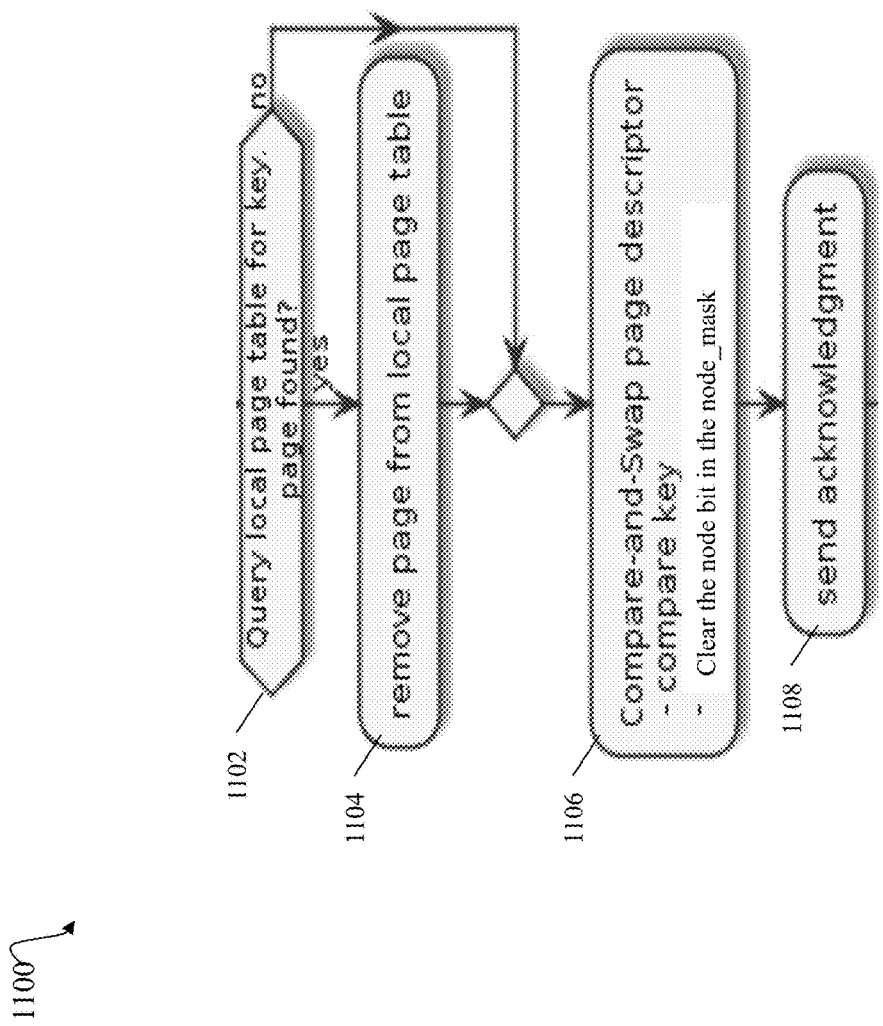

Referring to FIG. 11, shown is a flowchart 1100 of processing steps that may be performed by each board receiving the remove-page request as issued in step 1010 of FIG. 10. FIG. 11 processing removes the reference to (e.g., pointer to, or GM address of) a particular page of track MD from the board's local page table. The request received may identify the particular page of track MD and its associated pointer or GM address. At step 1102, processing is performed to query the local page table and determine whether the local page table contains the reference (pointer or GM address) for the particular page of track MD. If step 1102 evaluates to no, control proceeds to step 1106. If step 1102 evaluates to yes, control proceeds to step 1104 to remove the reference (pointer or GM address) for the particular page of track MD from the local page table. From step 1104, control proceeds to step 1106. At step 1106, a CAS operation is performed with respect to the page descriptor associated with the particular page of track MD. The CAS instruction compares the key of the page descriptor to ensure it has not been modified and, if it has not been modified, then clears a corresponding bit in the node_mask in the page descriptor to remove the board/local page table (thereby indicating that the local page table of the board that is performing processing of FIG. 11 no longer includes a reference (GM address or pointer) for the page of track MD being paged out of GM). From step 1106, processing proceeds to step 1108 where the acknowledgement is returned to the sender of the remove-page request.

In at least one embodiment in accordance with techniques herein, processing may also be performed to clean dirty pages (e.g., write out or flush dirty pages to non-volatile storage), and select which clean pages to page out of GM. Such processing to clean dirty pages may be performed responsive to any suitable conditions that may vary with embodiment. For example, processing to clean dirty pages may be performed periodically. The particular clean pages selected to be paged out of GM may be selected in accordance with any one or more suitable criteria that may vary with embodiment.

Figure 12:
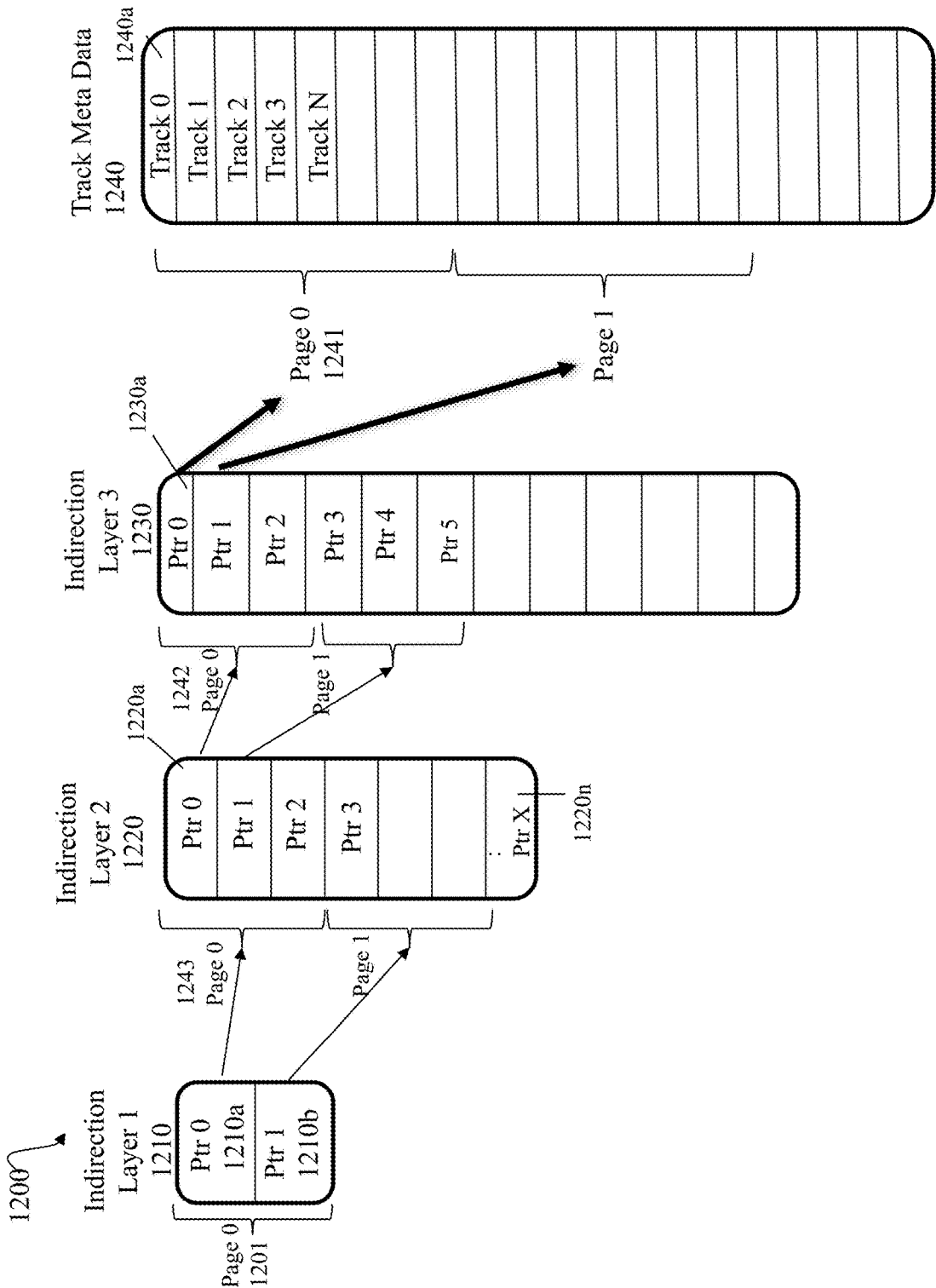
FIG. 12 is an example of multiple levels of indirection layers that may be used in an embodiment in accordance with techniques herein.

Described above are techniques that may be used in an embodiment with a single indirection layer. More generally, multiple levels of indirection may be utilized rather than the single indirection layer, for example, if the single indirection layer becomes too large. Reference is made to FIG. 12 illustrating multiple layers of indirection that may be used in an embodiment in accordance with techniques herein. The example 1200 includes 3 indirection levels or layers 1210, 1220, 1230. Elements 1230 and 1240 may correspond respectively to indirection layer 210 and track MD 100 (e.g., such as described in connection with FIGS. 6 and 7A). Elements 1210 and 1220 may be similar to indirection layer 1230 in that they each include pointers or GM addresses. However, element 1210 includes pointers or GM addresses 1210a-b to pages of indirection layer 2 pages; and element 1220 includes pointers or GM addresses 1220a-n to pages of indirection layer 3 pages. In at least one embodiment, each of the layers 1210, 1220 and 1230 along with the track MD 1240 may be stored in pages in GM. In at least one embodiment in accordance with techniques herein, pages of indirection layer 1 1210 may be stored in GM and may remain resident in GM (e.g. not paged out of GM), and pages of remaining indirection layers 1220, 1230 and also track MD 1240 may be paged in and out of GM.

In the example 1200, indirection layer 1 1210 may be characterized as the highest or first indirection layer; indirection layer 2 1220 may be characterized as the second or middle indirection layer; and indirection layer 3 1230 may be characterized as the lowest, third or deepest indirection layer. When accessing a particular track MD page of 1240 through the indirection layers of FIG. 12, processing may traverse the layers 1210, 1220, 1230 in sequential order. Thus, a miss or fault with respect to a reference indirection layer page may occur with respect to any of the indirection layers 1220 and 1230 as well as the track MD 1240. In at least one embodiment, the local page table of each board may include references or pointers to the GM page(s) including the pointers of the highest or first indirection layer 1210. However, additional references or pointers to other pages of indirection layers 1220 and 1230 may be omitted from the local page tables of the boards. Consistent with discussion herein and in a manner similar to that as described in connection with indirection layer 210 and track MD 100, an embodiment may similarly map or associate each entry of indirection layer 1210 with particular pages of indirection layers 1220, 1230 and track MD 1240. Such mapping and association with a particular pointer or entry of 1210 may denote that the particular associated pages of 1220, 1230 and 1240 may be accessed by traversing or using the particular pointer or entry of 1210. For example, track MD page 1241 may be accessed by traversing or using in sequence 1210a, 1220a, 1230a. Thus, track MD page 1241 may be characterized in one aspect as associated with, or accessible using, 1210a, 1220a and 1230a. The particular pages of the different indirection layers 1220, 1230 and track MD 1240 accessible using a particular indirection layer 1210 entry (1210a, 1210b) may be calculated based on the number of pointers or GM addresses in each of 1210, 1220, 1230 included in each indirection layer page. It will be appreciated by those skilled in the art that more detailed processing as described herein with reference to a single indirection layer may be readily adapted and expanded for use with multiple indirection layers or levels, such as the 3 indirection layers in the example 1200. More generally, techniques herein may be used in connection with any suitable number of one or more indirection layers or levels and is not limited to only 1 layer (e.g., FIG. 6) or 3 layers (e.g., FIG. 12) as specifically illustrated herein. Generally, in at least one embodiment using multiple indirection layers or levels, the highest or first referenced indirection layer 1210 may not be paged out of GM (e.g., remains resident in GM) and paging may be supported/performed for the remaining subsequently referenced indirection layers (1220 1230) and also the track MD 1240. Also, more generally in an embodiment with multiple indirection layers, one or more of the layers (including the highest or first indirection layer such as 1210) may be designated as remaining GM resident and not subject to paging out of GM. Also, more generally in an embodiment with multiple indirection layers, one or more of the layers along with track MD may be subject to paging out of GM.

In at least one embodiment, a different set of indirection layers may be used to denote the particular pages of MD for each LUN. In such an embodiment, the particular indirection layers and/or track MD pages which remain resident or stored in GM (e.g., cannot be paged out of GM) may vary with each particular LUN. For example, for a first LUN A for which very high performance is desired, it may be that all pages of all indirection layers and all of the LUN A track MD remain resident in GM (not subject to being paged out of GM). A second LUN B which is not so designated as a high performance LUN may only have pages of indirection layer 1 designated as GM resident/not subject to being paged out of GM (e.g., pages of all other indirection layers and track MD for LUN B may be paged out of GM). A third LUN C may be designated as a medium performance LUN (mid performance between/related to LUN A and LUN C) whereby all pages of all indirection layers remain resident in GM (not subject to being paged out of GM) but LUN C's track MD may be subject to GM paging.

Consistent with the above example and discussion regarding multiple indirection layers, it is noted that track MD page 1241 may be accessed by traversing or using in sequence 1210a, 1220a, 1230a. In at least one embodiment, the foregoing sequence 1210a, 1220a, 1230a may be traversed in order after taking a miss on page 1241, then a miss on 1242 and then a miss on 1243 before falling back to reading a corresponding GM address or pointer 1210a (to page 1243) from page 0, 1201 of the indirection layer 1 1210 (e.g., where pages 1241, 1242 and 1243 are not currently stored in GM resulting in GM misses and also misses in connection with queries of the local page table). In at least one embodiment in accordance with techniques herein, the local page tables of each of the boards 712a-n may include corresponding entries for those pages of the indirection layers 1210, 1220, 1230 and also track MD 1240 currently stored in GM. As noted above, an embodiment may possibly page-out of GM pages of 1240 and also page-out pages of layers 1220 and 1230 but not pages of 1210. In this case, a local page table may include entries indicating corresponding GM addresses for page(s) of layer 1210 and also possibly for any of the pages of 1220, 1230 and 1240 (when pages of 1220, 1230, 1240 are paged into GM). Additionally, for pages of layers 1220 and 1230 and also 1240 not paged into GM, their corresponding pointers or GM addresses in entries of 1210, 1220 and 1230 may be null.

In connection with obtaining track MD from page 1241 in such an embodiment, consider, for example, by a director attempting to access MD of 1241. The director may be perform processing as will now be described with reference to the flowcharts 1300, 1350 of FIGS. 13A and 13B.

The director may perform processing including a first step 1302 of querying the director's local page table for the GM address of 1241 thereby resulting in not locating a GM address for 1241 (e.g., miss with respect to the local page table). In a second step 1304, processing may be performed (e.g., by the director) to determine the particular indirection page of indirection layer 3, 1230 that includes the pointer or GM address of track MD page 0, 1241. Consistent with discussion above, the second step processing may include determining the particular indirection page of 1230 based on calculations and known page sizes, GM address or pointer sizes, number of GM addresses or entries per page, and the like, of each layer. In this example, the second step determines that indirection layer 3 page 0 (1242) including entry 1230a includes the desired GM address of track MD page 0, 1241. In a third step 1306, the director may query its local page table for the corresponding GM address of the indirection layer 3, page 0 (1242) thereby resulting in not locating a GM address for 1242 (e.g., miss with respect to the local page table). In a fourth step 1308, processing may be performed (e.g., by the director) to determine the particular indirection page of indirection layer 2, 1220 that is associated with the desired track MD page 1242 (e.g., determine the entry 1220a/page 0 (1243) of 1220 that includes the pointer or GM address of page 0 (1242) of the indirection layer 3, 1230). In this example, the fourth step determines that indirection layer 2, page 0 (1243) includes entry 1220a with the desired GM address of indirection layer 3, page 0 (1242). In a fifth step 1310, the director may query its local page table for the corresponding GM address of indirection layer 2, page 0 (1243) thereby resulting in not locating a GM address of 1243 (e.g., miss with respect to the local page table). In a sixth step 1312, processing may be performed (e.g., by the director) to determine the particular indirection page of indirection layer 1, 1210 that is associated with the desired track MD page 1243 (e.g., determine the entry 1210a/page 0 of 1210 that includes the pointer or GM address of page 0 (1243) of the indirection layer 2, 1220). In this example, the sixth step determines that indirection layer 1, page 0 (1201) includes entry 1210a with the pointer or desired GM address of indirection layer 2, page 0 (1243). In a seventh step 1314, the director may query its local page table for the corresponding GM address of indirection layer 1, page 0 (1201) resulting in a hit (whereby the local page table returns the GM address of 1201).

At this point, an eighth step 1316 may be performed that includes calculating the particular entry 1210a or offset in 1201 with the pointer/desired GM address of 1243. In this example, it is determined that 1210a includes a null pointer thereby indicating a GM page fault with respect to 1243 and processing is performed in a ninth step 1318 to page into GM the indirection layer 2 page 0 1243 (e.g., including allocating a new GM page frame, initializing the newly allocated GM page frame with the data of page 1243, initializing an associated page descriptor, and other processing that may be performed in connection with paging data into GM).

In a tenth step 1320, processing may be performed that includes calculating the particular entry 1220a or offset in 1243 with the pointer/desired GM address of 1242. In this example, it is determined that 1220a includes a null pointer thereby indicating a GM page fault (e.g., page 1242 is currently paged out of GM/not stored in GM) and processing is performed in an eleventh step 1322 to page into GM the indirection layer 3 page 0 1242 (e.g., including allocating a new GM page frame, initializing the newly allocated GM page frame with the data of page 1242, initializing an associated page descriptor, and other processing that may be performed in connection with paging data into GM).

In a twelfth step 1324, processing may be performed that includes calculating the particular entry 1230a or offset in 1242 with the pointer/desired GM address of track MD page 0, 1241. In this example, it is determined that 1230a includes a null pointer thereby indicating a GM page fault and processing is performed in an thirteenth step 1326 to page into GM the track MD page 1241 (e.g., including allocating a new GM page frame, initializing the newly allocated GM page frame with the data of page 1241, initializing an associated page descriptor, and other processing that may be performed in connection with paging data into GM). At this point, based on further calculations for the desired track 0, it may be determined that offset or entry 1240a includes the desired track MD. In a fourteenth step 1328, the desired track MD 1240a may be obtained from track MD page 0, 1241.

Additionally, in connection with paging into GM any data page as described herein (e.g., such as for pages of 1220, 1230 and 1240), the local page table of the director performing the processing such as described above may be accordingly updated to reflect the GM addresses of such pages. Similarly, null entries of pages of the indirection layers may be updated as various indirection layer pages and/or track MD pages are paged into GM (e.g., steps 1318, 1322, 1326 also include, respectively, updating entries 1210a, 1220a, 1230a).

Figure 13A:
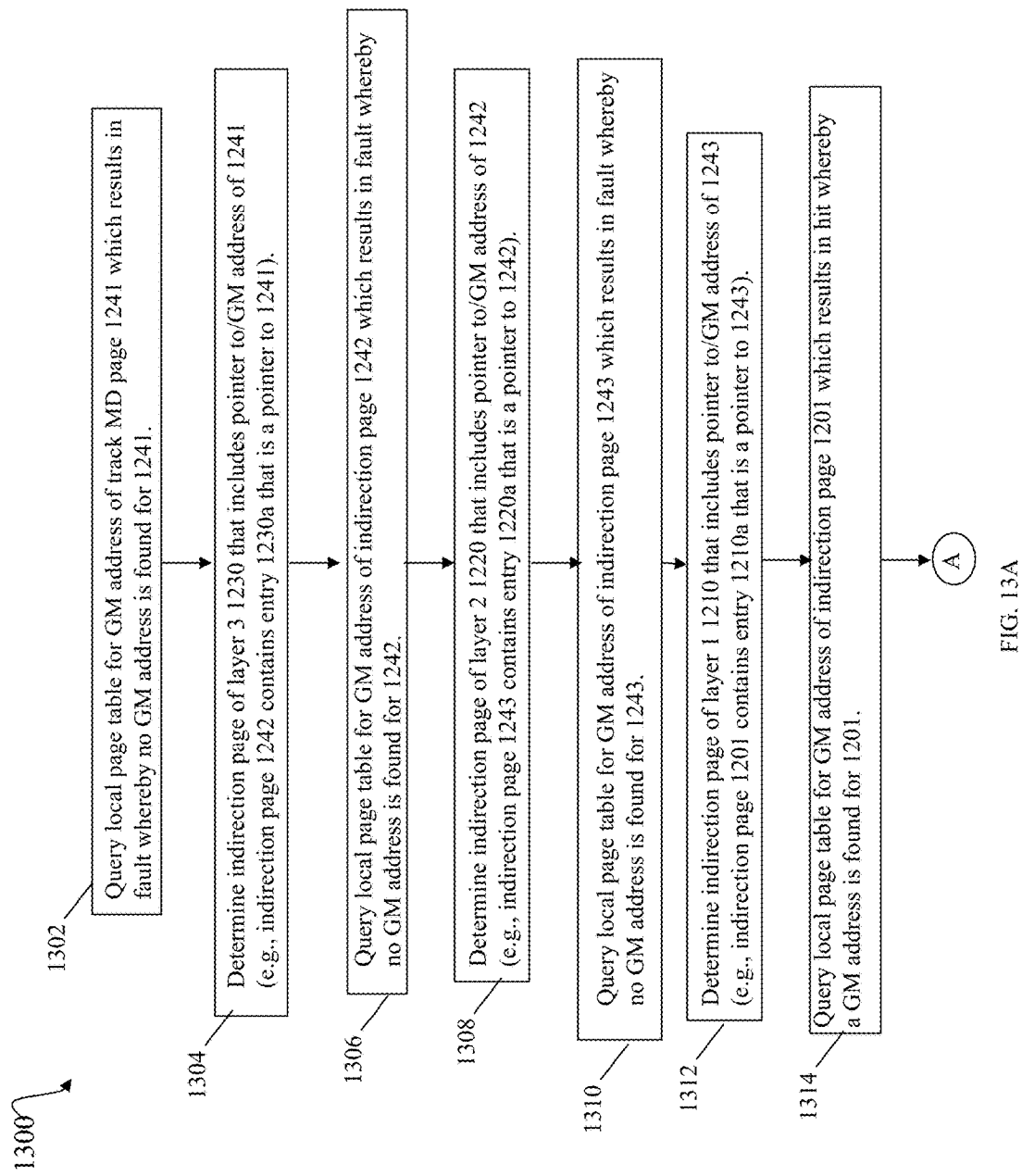
Figure 13B:
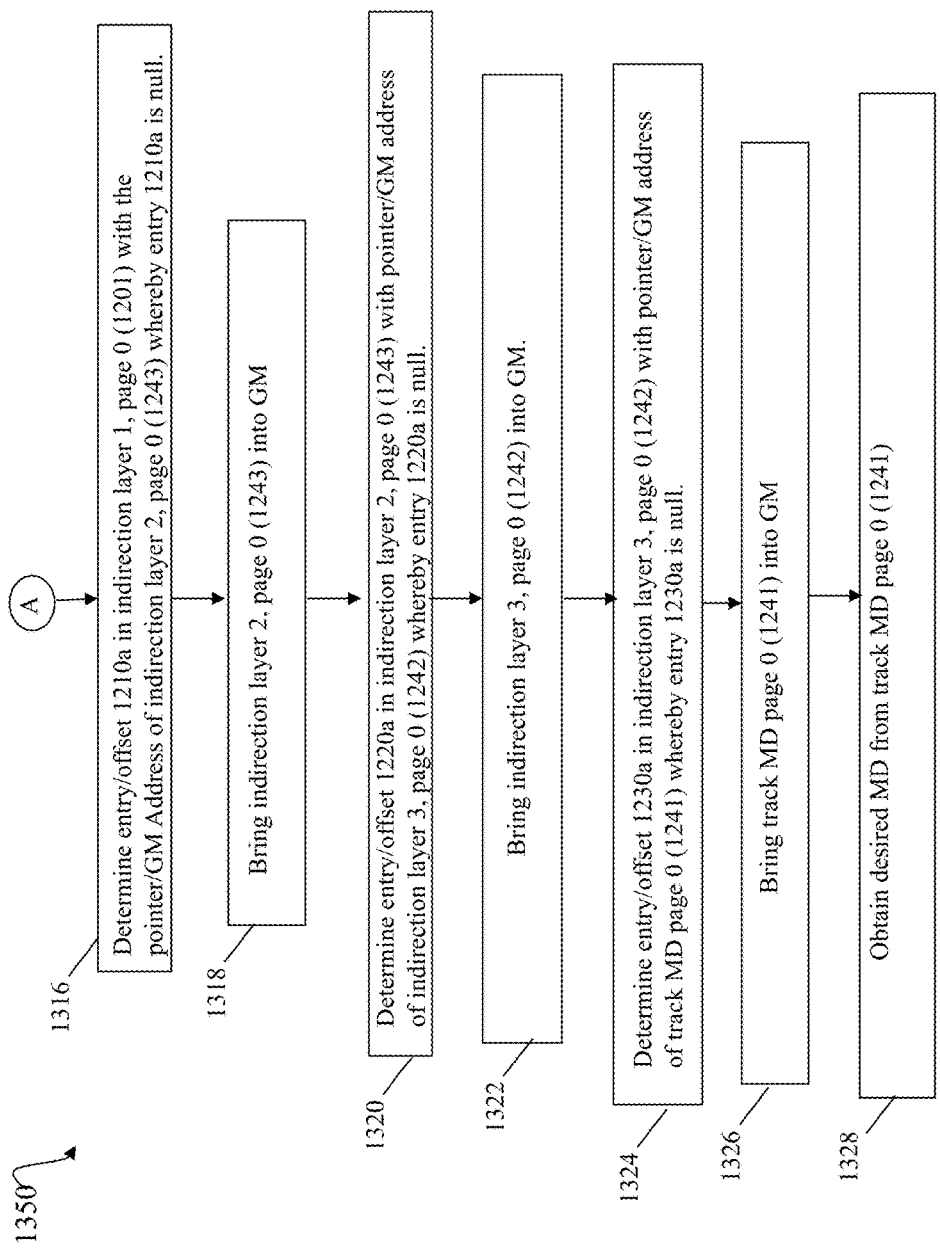

As will be appreciated by those skilled in the art in connection with FIGS. 13A and 13B, processing is described above where the desired page of track MD 1241 and indirection layer pages 1242, 1243 are all paged out of GM (e.g., whereby querying the local page table for GM addresses of the desired pages of track MD 1241 and indirection layer pages 1242, 1243 results in a miss with respect to the local page table). However, as will be appreciated by those skilled in the art, any one or more of the foregoing pages 1241, 1242, and 1243 may alternatively be paged into GM whereby the local page table would include valid GM addresses for such pages stored in GM. In such a case, processing may be performed commencing with the first such page encountered which is currently stored in GM. For example, assume page 1241 is paged out of GM but page 1242 is currently stored/paged into GM. In this case, the local page table query in step 1306 returns the GM address of 1242 (rather than a fault) whereby entry 1230a is null and processing is performed to bring 1241 into GM, accordingly update entry 1230a, and obtain the desired track MD from track MD page 1241.

It should be noted that generally when paging data into GM, such as paging in the track MD, the track MD (or any other data being paged into GM) may be paged into GM from a source location that is any suitable source location. For example, consistent with discussion herein, the source location may be back-end physical non-volatile storage which is accessed by the DA as one possible form of non-volatile storage. More generally, an embodiment may store the MD on any form of non-volatile storage and access such MD as needed to be paged into and out of GM in any suitable manner. For example, in at least one other embodiment in accordance with techniques herein, the MD being paged into GM may be stored on a source location on non-volatile storage that is a form of flash-based physical storage included in memory cards, such as flash SLICs, of the data storage system. Additionally, in such an other embodiment where the track MD may be stored on flash SLICs, each of the directors or adapters (e.g., HAs, DAs, etc.) may access MD as needed from the flash SLICs. For example, each HA and DA may access the MD from a flash SLIC as needed by directly accessing the flash SLIC rather than obtaining such needed MD through the DA (as in the former embodiment noted above). Thus, for purposes of illustration, examples herein may refer to one particular embodiment in which the MD is stored on non-volatile back-end storage and retrieved by the DA. However, it will be appreciated by those skilled in the art that techniques described herein are not so limited to embodiments described herein for purposes of illustration and example.

An embodiment may implement the techniques herein using code executed by a processor. For example, an embodiment may implement the techniques herein using code which is executed by a processor. As will be appreciated by those skilled in the art, the code may be stored on a computer-readable medium having any one of a variety of different forms including volatile and nonvolatile, removable and non-removable media implemented in any method or technology for storage of information such as computer readable instructions, data structures, program modules or other data. Computer-readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:
1. A method of obtaining metadata comprising:
receiving, by a director, an I/O operation directed to a target offset of a logical device, wherein the director is located on a board including a local page table used by components on the board, wherein the board is one of a plurality of boards, wherein the local page table is one of a plurality of local page tables, and wherein each of the plurality of boards includes a different one of the plurality of local page tables used by components of said each board;
querying the local page table for a global memory address of first metadata for the target offset of the logical device; and
responsive to the local page table not having the global memory address of the first metadata for the target offset of the logical device, using at least a first indirection layer to obtain the global memory address of the first metadata, wherein the first indirection layer is used to obtain a first page including the first metadata for the logical device, wherein the first page is stored at a first global memory address and wherein the first page has a corresponding page descriptor that includes a node mask identifying which of the plurality of boards includes one of the plurality of local page tables with a reference to the first global memory address stored in the one local page table.

2. The method of claim 1, wherein the global memory address is an address in a distributed global memory comprising a plurality of global memory segments stored on the plurality of boards, wherein a first of the plurality of global memory segments is included on the board with the director.

3. The method of claim 2, wherein the first indirection layer includes a plurality of pointers to pages of metadata for the logical device, and wherein the first indirection layer is stored in the distributed global memory.

4. The method of claim 3, wherein the pages of metadata for the logical device include the first page and wherein the pages of metadata for the logical device are configured to be paged in and out of the distributed global memory at various points in time.

5. The method of claim 4, wherein each of the plurality of boards includes at least one director that uses a particular one of the plurality of local pages tables, included on said each board, to obtain metadata for at least one logical device.

6. The method of claim 1, wherein the first metadata is used in connection with servicing the I/O operation, and wherein the first metadata includes any of:
location information identifying a physical storage area mapped to the target offset of the logical device;
cache location information denoting if user data of the target offset of the logical device is stored in cache and if so, identify a location in the cache where the user data is stored; and
information used to verify or validate the user data.

7. The method of claim 5, wherein the first page including the first metadata has the corresponding page descriptor stored in the distributed global memory, wherein the page descriptor includes the node mask and further includes:
a lock used to control and synchronize access to the corresponding page descriptor;
an indicator denoting whether data of the first page stored in the distributed global memory is clean or dirty, wherein dirty indicates that the data of the first page stored in the distributed global memory is a more recent version than another copy of data of the first page stored on non-volatile storage; and
a key identifying data stored in the first page, or otherwise denoting that a page of global memory associated with the page descriptor is free.

8. The method of claim 7, wherein the node mask is used in connection with first processing performed to remove the first page from the distributed global memory, wherein the first processing includes selectively sending a request to each of the plurality of boards identified in the node mask, the request requesting that said each board remove the reference to the first global memory address from one of the plurality of local page tables included on said each board.

9. The method of claim 8, wherein a compare and swap operation is performed to write to the distributed global memory in connection with modifying at least one of: the page descriptor, the first indirection layer, and the first metadata of the first page stored at the first global memory address.

10. The method of claim 1, wherein a plurality of indirection layers include the first indirection layer, and wherein the plurality of indirection layers are used to obtain the global memory address of the first metadata.

11. The method of claim 10, wherein the global memory is a distributed global memory, the plurality of indirection layers are stored in the distributed global memory, and wherein at least a second of the plurality of indirection layers includes pages configured to be paged in and out of the distributed global memory.

12. The method of claim 11, wherein the plurality of indirection layers includes global memory addresses of locations in the distributed global memory.

13. The method of claim 11, wherein one of the indirection layers includes global memory addresses storing metadata for the logical device.

14. A system comprising:
one or more processors; and
a memory comprising code stored thereon that, when executed, performs a method of obtaining metadata comprising:
receiving, by a director, an I/O operation directed to a target offset of a logical device, wherein the director is located on a board including a local page table used by components on the board, wherein the board is one of a plurality of boards, wherein the local page table is one of a plurality of local page tables, and wherein each of the plurality of boards includes a different one of the plurality of local page tables used by components of said each board;
querying the local page table for a global memory address of first metadata for the target offset of the logical device; and
responsive to the local page table not having the global memory address of the first metadata for the target offset of the logical device, using at least a first indirection layer to obtain the global memory address of the first metadata, wherein the first indirection layer is used to obtain a first page including the first metadata for the logical device, wherein the first page is stored at a first global memory address and wherein the first page has a corresponding page descriptor that includes a node mask identifying which of the plurality of boards includes one of the plurality of local page tables with a reference to the first global memory address stored in the one local page table.

15. A non-transitory computer readable medium comprising code stored thereon that, when executed, performs a method of obtaining metadata comprising:
receiving, by a director, an I/O operation directed to a target offset of a logical device, wherein the director is located on a board including a local page table used by components on the board, wherein the board is one of a plurality of boards, wherein the local page table is one of a plurality of local page tables, and wherein each of the plurality of boards includes a different one of the plurality of local page tables used by components of said each board;
querying the local page table for a global memory address of first metadata for the target offset of the logical device; and
responsive to the local page table not having the global memory address of the first metadata for the target offset of the logical device, using at least a first indirection layer to obtain the global memory address of the first metadata, wherein the first indirection layer is used to obtain a first page including the first metadata for the logical device, wherein the first page is stored at a first global memory address and wherein the first page has a corresponding page descriptor that includes a node mask identifying which of the plurality of boards includes one of the plurality of local page tables with a reference to the first global memory address stored in the one local page table.

16. The non-transitory computer readable medium of claim 15, wherein the global memory address is an address in a distributed global memory comprising a plurality of global memory segments stored on the plurality of boards, and wherein a first of the plurality of global memory segments is included on the board with the director.

17. The non-transitory computer readable medium of claim 16, wherein the first indirection layer includes a plurality of pointers to pages of metadata for the logical device, and wherein the first indirection layer is stored in the distributed global memory.

18. The non-transitory computer readable medium of claim 17, wherein the pages of metadata for the logical include the first page and wherein the pages of metadata for the logical device are configured to be paged in and out of the distributed global memory at various points in time.

* * * * *